(12) United States Patent
Funada

(10) Patent No.: US 11,470,290 B2
(45) Date of Patent: Oct. 11, 2022

(54) IMAGE DISPLAY APPARATUS

(71) Applicant: CANON KABUSHIKI KAISHA, Tokyo (JP)

(72) Inventor: Masahiro Funada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/009,276

(22) Filed: Sep. 1, 2020

(65) Prior Publication Data

US 2020/0396430 A1    Dec. 17, 2020

Related U.S. Application Data

(63) Continuation of application No. PCT/JP2019/007992, filed on Mar. 1, 2019.

(30) Foreign Application Priority Data

Mar. 8, 2018  (JP) .............................. JP2018-042039
May 29, 2018 (JP) .............................. JP2018-102503

(51) Int. Cl.
*H04N 9/31* (2006.01)
*G06T 5/00* (2006.01)
(Continued)

(52) U.S. Cl.
CPC ........... *H04N 9/3179* (2013.01); *G06T 5/009* (2013.01); *H04N 5/57* (2013.01); *H04N 9/312* (2013.01);
(Continued)

(58) Field of Classification Search
CPC .......... G09G 5/00; G09G 5/003; G09G 1/165; G09G 3/2092; G09G 5/02; G09G 3/2003;
(Continued)

(56) References Cited

U.S. PATENT DOCUMENTS 5,406,305 A * 4/1995 Shimomura ......... G09G 3/3406
345/102
7,944,431 B2   5/2011 Tanaka
(Continued)

FOREIGN PATENT DOCUMENTS

JP    2003324670 A    11/2003
JP    2006227187 A    8/2006
(Continued)

OTHER PUBLICATIONS

English translation of Written Opinion issued in Intl. Appln. No. PCT/JP2019/007992 dated May 21, 2019, previously cited in IDS filed Sep. 1, 2020.
(Continued)

*Primary Examiner* — John W Miller
*Assistant Examiner* — Humam M Satti
(74) *Attorney, Agent, or Firm* — Rossi, Kimms & McDowell LLP

(57) ABSTRACT

An image display apparatus includes a display, an input unit configured to receive input data including an input image in which a first dynamic range is defined and including information relating to luminance of the input image, and at least one processor or circuit for executing tasks of converting the first dynamic range into a second dynamic range having a maximum luminance lower than that of the first dynamic range, acquiring a user set maximum luminance of the second dynamic range, acquiring a maximum display luminance when the display unit displays the maximum luminance of the second dynamic range under a display condition set for the display unit, and generating a setting screen for a user setting. The setting screen displays information indicating a relative relation among the information relating to luminance acquired from the data, the user set maximum luminance and the maximum display luminance.

16 Claims, 12 Drawing Sheets

(51) Int. Cl.
*H04N 5/57* (2006.01)
*G06F 3/04847* (2022.01)

(52) U.S. Cl.
CPC .......... *H04N 9/317* (2013.01); *H04N 9/3194* (2013.01); *G06F 3/04847* (2013.01); *G06T 2207/20208* (2013.01)

(58) Field of Classification Search
CPC .......... G09G 3/3607; G09G 5/005–06; G09G 1/167; G09G 3/2096; G09G 5/04; G09G 2320/00; G09G 2320/02; G09G 2320/06; G09G 2320/0606; G09G 2320/0613; G09G 2320/062; G09G 2320/0633; G09G 2320/064; G09G 2320/0646; G09G 2320/0653; G09G 2320/066; G09G 2320/0666; G09G 2320/0673; G09G 2320/068; G09G 2320/0686; G09G 2320/0693; G09G 2320/08; G09G 2320/0276; G09G 2354/00; G09G 3/36; G09G 5/10; H04N 9/3179; H04N 5/57; H04N 9/312; H04N 9/317; H04N 9/3194; H04N 5/202; H04N 9/3182; G06T 5/009; G06T 2207/20208; G06F 3/04847; G06F 3/0482
See application file for complete search history.

(56) References Cited

U.S. PATENT DOCUMENTS

| | | | |
|---|---|---|---|
| 7,952,637 B2 | 5/2011 | Seki | |
| 2009/0033591 A1 | 2/2009 | Ikeya | |
| 2009/0079721 A1* | 3/2009 | Gettemy | G09G 3/3406 345/207 |
| 2010/0110311 A1* | 5/2010 | Sade | G02B 27/0101 348/750 |
| 2011/0103685 A1* | 5/2011 | Bhatt | G06T 5/009 382/167 |
| 2013/0082991 A1* | 4/2013 | Lin | G09G 5/00 345/207 |
| 2016/0205338 A1* | 7/2016 | Kozuka | H04N 5/57 348/687 |
| 2017/0061591 A1* | 3/2017 | Park | G09G 3/2092 |
| 2017/0285907 A1* | 10/2017 | Li | G06F 3/0488 |
| 2017/0318270 A1* | 11/2017 | Fukuda | H04N 9/3185 |
| 2018/0308434 A1* | 10/2018 | Nakanishi | F21S 2/00 |
| 2018/0359507 A1* | 12/2018 | Oh | H04N 21/2343 |
| 2019/0052834 A1* | 2/2019 | Nishigaki | G09G 5/10 |

FOREIGN PATENT DOCUMENTS

| | | | |
|---|---|---|---|
| JP | 2008122713 A | 5/2008 | |
| JP | 2015145892 A | 8/2015 | |
| JP | 2017050840 A | 3/2017 | |
| JP | 2017163536 A | 9/2017 | |
| JP | 2017169133 A | 9/2017 | |
| WO | 2006137235 A1 | 12/2006 | |

OTHER PUBLICATIONS

International Preliminary Report on Patentability issued in Intl. Appln. No. PCT/JP2019/007992 dated Sep. 17, 2020. English translation provided.
International Search Report issued in Intl. Appln. No PCT/JP2019/007992 dated May 21, 2019. English translation provided.
Written Opinion issued in Intl. Appln. No. PCT/JP2019/007992 dated May 21, 2019.
Office Action issued in Japanese Appln. No. 2018-102503 dated Apr. 21, 2020. English machine translation provided.
Office Action issued in Japanese Appln. No. 2018-042039 dated May 12, 2020. English machine translation provided.

* cited by examiner

IMAGE DISPLAY APPARATUS

CROSS-REFERENCE TO RELATED APPLICATIONS

This application is a Continuation of International Patent Application No. PCT/JP2019/007992, filed on Mar. 1, 2019, which claims the benefit of Japanese Patent Application No. 2018-042039, filed on Mar. 8, 2018, and the benefit of Japanese Patent Application No. 2018-102503, filed on May 29, 2018, each of which is hereby incorporated by reference herein in their entirety.

BACKGROUND OF THE INVENTION

Field of the Invention

The present invention relates to an image display apparatus such as a projector and a direct view display.

Description of the Related Art

An image display apparatus that can display an HDR (high dynamic range) image has a luminance conversion characteristic that prevent it from being saturated a luminance that is conventionally saturated, in order to make feeling of viewing an image closer to actual feeling of viewing with naked eyes than that of a conventional SDR (standard dynamic range) image. It is desirable that such an HDR image compatible image display apparatus has a sufficiently high luminance display ability, but in practice, most of them do not have the sufficiently high luminance display ability. On the other hand, the number of image display apparatuses is increasing that can display a luminance higher than a maximum value of a dynamic range of the SDR image of 100 $[cd/m^2]$ so as to display an image to be easily viewed in a bright viewing environment.

Japanese Patent Laid-Open No. ("JP") 2017-050840 discloses a method for converting a dynamic range for displaying an HDR image on a high-luminance SDR image compatible image display apparatus in an HDR compatible source device. This conversion method performs an HDR image dynamic range conversion according to a displayable luminance of the image display apparatus, performs an inverse EOTF conversion on the image after the dynamic range conversion using an inverse EOTF of an SDR image, and transmits an image signal to the image display apparatus. The EOTF is an abbreviation for an Electro-Optical Transfer Function. The image display apparatus can display a high luminance image up to the displayable luminance expanded to higher than 100 $[cd/m^2]$ only by performing normal image signal processing on the image after the inverse EOTF conversion. JP 2017-050840 discloses that it is possible to display a menu screen for allowing a user to adjust the displayable luminance and a sample image for confirmation thereof in case the displayable luminance is unknown.

The conversion method disclosed in JP 2017-050840 can be applied to an HDR image compatible image display apparatus that does not have sufficient displayable luminance. However, when the user adjusts the dynamic range, it is difficult for the user to determine whether the dynamic range is suitably adjusted for an input HDR image even if the user can adjust the sample image to be easily seen.

Moreover, although there is a case where it is possible to acquire a more suitable visual environment by adjusting the display luminance, the user may not notice that, or even when the user notices it, the user may not know how to adjust the display luminance.

The present invention provides an image display apparatus that can improve convenience of adjusting a dynamic range and a display luminance when displaying an HDR image.

SUMMARY OF THE INVENTION

An image display apparatus as one aspect of the present invention includes a display unit configured to display an image, an input unit configured to receive input data including an input image in which a first dynamic range is defined and including information relating to luminance of the input image, and at least one processor or circuit configured to execute a plurality of tasks of a converting task configured to convert the first dynamic range into a second dynamic range having a maximum luminance lower than that of the first dynamic range, a set value acquiring task configured to acquire a user set maximum luminance that is a user set value of the maximum luminance of the second dynamic range, a luminance acquiring task configured to acquire a maximum display luminance that is a display luminance when the display unit displays the maximum luminance of the second dynamic range under a display condition set for the display unit; and a generating task configured to generate a setting screen used for a user setting and to make the display unit display the setting screen. The setting screen displays a) information indicating a relative relation among the information relating to luminance acquired from the data, b) the user set maximum luminance and c) the maximum display luminance.

A control method as another aspect of the present invention is a control method of an image display apparatus including a display unit configured to display an image, and configured to receive input data including an input image in which a first dynamic range is defined and including information relating to luminance of the input image. The control method includes steps of converting the first dynamic range into a second dynamic range having a maximum luminance lower than that of the first dynamic range, acquiring a user set maximum luminance that is a user set value of the maximum luminance of the second dynamic range, acquiring a maximum display luminance that is a display luminance when the display unit displays the maximum luminance of the second dynamic range under a display condition set for the display unit, and generating a setting screen used for a user setting and making the display unit display the setting screen. The setting screen displays a) information indicating a relative relation among the information relating to luminance acquired from the data, b) the user set maximum luminance and c) the maximum display luminance.

A non-transitory computer-readable storage medium storing a computer program that causes a computer to execute the above controlling method is also constitute another aspect of the present invention.

Further features of the present invention will become apparent from the following description of exemplary embodiments with reference to the attached drawings.

DESCRIPTION OF THE EMBODIMENTS

Figure 1:
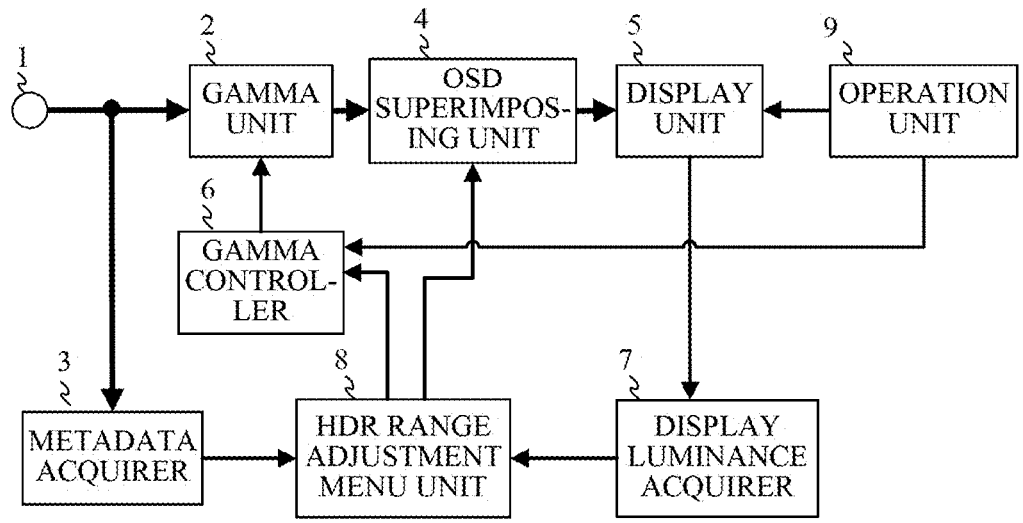
FIG. 1 is a block diagram illustrating a configuration of an image display apparatus as a first embodiment of the present invention.

Referring now to the drawings, a description will be given of embodiments according to the present invention.

First Embodiment

FIG. 1 illustrates a configuration of an image display apparatus which is the first embodiment according to the present invention. The image display apparatus includes a projector (image projection apparatus) and a direct view display.

The image display apparatus according to this embodiment includes an image input unit 1, a gamma unit 2, a metadata acquirer 3, an OSD superimposing unit 4, a display unit 5, a gamma controller 6, a display luminance acquirer 7, an HDR range adjustment menu unit 8 and an operation unit 9.

The image input unit 1 as an input unit includes a terminal for receiving an HDR image, as an input image, input as an image signal from an HD player, a computer, or the like, for example, an HDMI® terminal for which an HDR image transmission/reception is defined as a standard. HDMI is merely an example, and a terminal of another standard such as DisplayPort may be used as long as it is possible to transmit/receive the HDR image and metadata described later. For an HDR image, an EOTF (Electro-Optical Transfer Function) indicating a relation between a code value and a luminance is defined. As this EOTF, HDMI uses SMPTE ST2084 standardized by Society of Motion Picture and Television Engineers (SMPTE). ST2084 defines code values for luminance up to 10,000 nits. This embodiment will be described on a premise that the EOTF of ST2084 is used, but another EOTF may be used.

The gamma unit 2 has a lookup table and is configured to convert an EOTF of the HDR image input from the image input unit 1 into a reference EOTF. The EOTF of the HDR image corresponds to a first EOTF for a first dynamic range defined for the HDR image. The reference EOTF corresponds to a second EOTF defined for a second dynamic range in which a maximum luminance is lower than that in the first dynamic range. The reference EOTF is an EOTF that is a standard in the image display apparatus and that is set by the gamma controller 6, and in this embodiment, the reference EOTF is a curve of a gamma 2.2 which is an EOTF of an SDR image. The gamma unit 2 and the gamma controller 6 configure a converting unit.

The gamma 2.2 is merely an example, and a gamma 2.4 or a completely different curve with a consideration of characteristics of the display unit 5 may be used. The lookup table may be able to extend a tone (luminance) by 2 bits or more for each color of RGB so as not to cause a gradation loss. The gamma unit 2 is configured to output the image converted into the reference EOTF.

The metadata acquirer 3 is configured to read information relating to luminance of the HDR image from metadata input as additional information for the HDR image from the image input unit 1. The information relating to luminance includes a MaxCLL (Maximum Content Light Level) or a MaxFALL (Maximum Frame-Average-Light Level) each of which is defined by 861.3A standardized by Consumer Technology Association (CTA). However, the MaxCLL and the MaxFALL are merely examples, and other information may be used as long as the information relates to the luminance of the HDR image. The metadata acquirer 3 is configured to output the read information relating to luminance (hereinafter referred to as luminance information) to the HDR range adjustment menu unit 8.

The OSD superimposing unit 4 is configured to superimpose an image indicating various menu screens output from the HDR range adjustment menu unit 8 described later on the image output from the gamma unit 2. The various menu screens are displayed for allowing a user perform an operation of changing various setting values of the image display apparatus in conjunction with the operation unit 9.

A configuration of the display unit 5 differs depending on a type of the image display apparatus. When the image display apparatus is a projector (image projection apparatus), the display unit 5 is configured to drive a light modulation element according to the image from the OSD superimposing unit 4, to generate an image light by modulating an illumination light from a light source by using the light modulation element, and to project the image light via a projection optical system onto a projection surface such as a screen. Thereby, a projection image is displayed on the projection surface. A liquid crystal panel, a digital micromirror device, or the like is used as the light modulation element. When the image display apparatus is a direct view display, the display unit 5 displays an image on an image display surface (display screen) by driving the light modulation element according to the image from the OSD superimposing unit 4. A liquid crystal panel, an organic EL element, or the like is used as the light modulation element.

The display unit 5 is also configured to convert the reference EOTF according to a VT (display luminance with respect to an input voltage) characteristic of the light modulation element into a voltage to be applied to the light modulation element. The display unit 5 can display an image under various display conditions (also referred to as display states). The display condition includes a light emission intensity of the light source and an aperture value (F-number), a zooming state and a focus position of the projection optical system. When the image display apparatus is a direct view liquid crystal display, the display condition includes a backlight amount.

ST2084 described above supports luminance up to 10,000 nits, but in practice, there are few cases in which such a high luminance is required, and in most cases, 1,000 to 3,000 nits is sufficient. Thus, in this embodiment, the maximum output luminance is set to 3,000 nits for the image display apparatus. Via the operation unit 9, it is possible to perform an output luminance adjustment for adjusting an output luminance according to a display condition set by the user. That is, even if the tone input to display unit 5 is the same, the output luminance varies according to the output luminance adjustment.

The gamma controller 6 is configured to generate a gamma curve to be set for the lookup table of the gamma unit 2. Since the EOTF of ST2084 is coded with an absolute luminance, it is necessary to clip or compress an input tone that exceeds the display luminance. In this embodiment, the input tone exceeding the display luminance is clipped in order to simplify a description. The gamma curve set for the gamma unit 2 is generated as a curve that clips a range higher than an input tone threshold (hereinafter referred to as a clipping threshold) set according to the output luminance adjustment in display unit 5, and that, for a range equal to or lower than the clipping threshold, is acquired by multiplying the EOTF of ST2084 by an inverse gamma of the gamma 2.2. That is, the clipping threshold is a maximum input tone that is not clipped.

Figure 2:
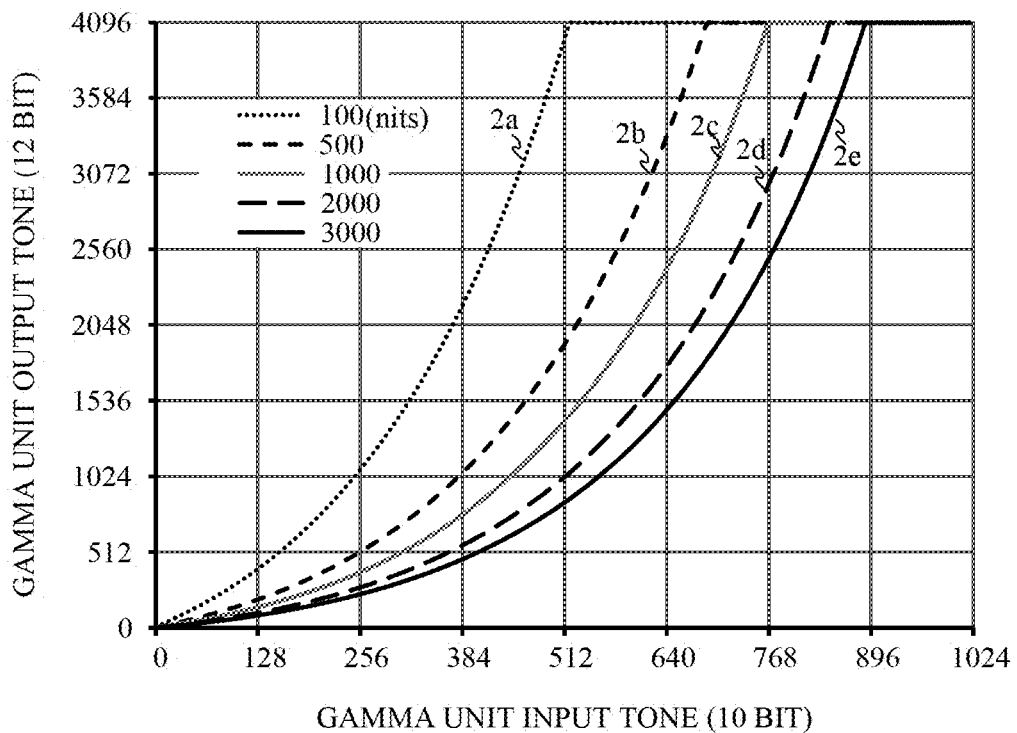
FIG. 2 is a diagram illustrating an example of a set curve of a gamma unit according to the first embodiment.

A description will be given of the gamma curve generated by the gamma controller 6 with reference to FIG. 2. FIG. 2 illustrates five types of gamma curves 2a to 2e set for the gamma unit 2, each of which indicates each relation between the input tone and an output tone (luminance). As described above, in this embodiment, since the output tone is expanded by 2 bits for the input tone, an input of 10 bits becomes an output of 12 bits.

The gamma curve 2a is a gamma curve of 100 nits, is set so that the output tone becomes the maximum value at a code value (input tone) corresponding to 100 nits, and so that, for code values below that code value, the relation between the input tone and the output tone becomes a curve acquired by multiplying the EOTF of ST2084 by the inverse gamma of the gamma 2.2. Similarly, the gamma curves 2b, 2c, 2d, and 2e are respectively set so that the output tones become the maximum values at code values corresponding to 500 nits, 1000 nits, 2000 nits, and 3000 nits, and so that, for code values below those code values, the curves are acquired by multiplying the EOTFs of ST2084 by the inverse gamma of the gamma 2.2. Thus, if the output luminance adjustment of the display unit 5 is made so that the output luminance as a projector is 2,000 nits, the tone of 2,000 nits or less of the image input by the EOTF of ST2084 is output in a faithful luminance.

The five types of gamma curves of 100 nits to 3,000 nits illustrated in FIG. 2 are examples, and the number and range of gamma curves generated by the gamma controller 6 may be different from the above examples. Since the display luminance may be doubled by projecting an image onto a same projection position from two projectors, the maximum value of the clipping threshold of the gamma curve generated by the gamma controller 6 may exceed the maximum output luminance of each projector.

As a method of generating a gamma curve, there are various methods such as a method of storing set values of setting points of the lookup table of the gamma unit 2 as an array in a control program for the number of gamma curves in advance, and a method of generating the gamma curve by an arithmetic expression.

The display luminance acquirer 7 as a luminance acquiring unit is configured to acquire a maximum display luminance which is a display luminance when the maximum luminance of the second dynamic range described above is displayed in the display condition actually set for the display unit 5, and to output the maximum display luminance to the HDR range adjustment menu unit 8. As an acquisition method for the maximum display luminance, there is a method of storing the maximum display luminance linked to various display conditions of display unit 5 in advance on a memory such as a nonvolatile memory (not illustrated), and of reading a maximum display luminance corresponding to an actually set display condition from the memory.

Specifically, in the projector in which the display unit 5 has function of adjusting zoom and focus, the maximum display luminance on the projection surface is correlated with the projection size (projection area) on the projection surface. The projection size is correlated with a projection distance, which is a distance between the projector and the projection surface, and the zooming state (magnification ratio). The projection distance is correlated with the focus position (focus state) that is a position of a lens performing focusing when the projection image is in focus. Thus, it is possible to link the maximum display luminance on the projection surface to the zooming state and the focus position.

The maximum display luminance for various zooming states and focus positions may be measured during a manufacturing process of the projector. The user may input the projection size on the projection surface via the operation unit 9 and the maximum display luminance may be calculated from the projection size.

In the liquid crystal display, if the backlight amount can be adjusted in the display unit 5, the maximum display luminance for each backlight amount may be measured and stored on the nonvolatile memory during the manufacturing process. When the state of display unit 5 cannot be read, the luminance of the projection image or of the image display surface may be measured using a luminance sensor.

If the display unit 5 has a luminance adjustment function for adjusting the display luminance by changing a light emission intensity of the light source or a light reduction amount of the light emitted from the light source, the maximum display luminance may be acquired using the adjusted light emission intensity or the adjusted light reduction amount.

The above described plurality of acquisition methods for the maximum display luminance may be combined. The maximum display luminance may be able to be acquired with high accuracy, but it is important to have a function of acquiring the maximum display luminance even if the accuracy is low, and thus an acquisition method other than the acquisition method described above may be used.

The HDR range adjustment menu unit 8 as a generating unit is configured to generate an HDR range adjustment menu screen (hereinafter simply referred to as an HDR range adjustment menu) as a setting screen for allowing the user to adjust (set) a display range of the HDR image via the operation unit 9 as a set value acquiring unit. The HDR range adjustment menu is output to the OSD superimposing unit 4 and is superimposed on the image from the gamma unit 2. The HDR range adjustment menu in this embodiment is displayed for setting a user adjustment value of the clipping threshold of the gamma curve generated by the gamma controller 6 (that is, user set value of maximum luminance of second dynamic range, or user set maximum luminance).

The HDR range adjustment menu is configured to display the MaxCLL and the MaxFALL acquired by the metadata acquirer 3, the user adjustment value, and the maximum display luminance acquired by the display luminance acquirer 7 with an indicator that indicates relative relation of those in an easy-to-understand manner on the same screen. This indicator is displayed so that the user can easily perform adjustment work while referring to this indicator.

Figure 3:
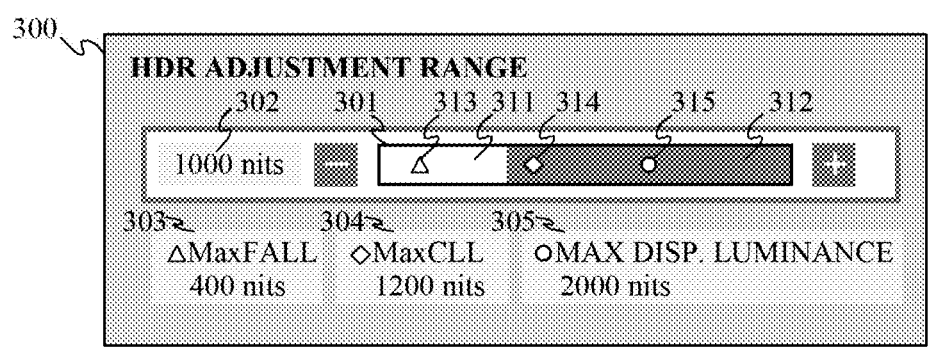
FIG. 3 is a diagram illustrating an HDR range adjustment menu according to the first embodiment.

FIG. 3 illustrates an example of an HDR range adjustment menu 300. The HDR range adjustment menu 300 includes an indicator 301, a user adjustment value 302 of the clipping threshold, a legend 303 representing the MaxFALL, a legend 304 representing the MaxCLL, and a legend 305 representing the maximum display luminance (max disp. luminance in figures).

The indicator 301 displays a relation between an adjustable range of the clipping threshold and a luminance range displayed without clipping, and displays a display range 311, a clipping range 312, a MaxFALL value 313, a MaxCLL value 314, and a maximum display luminance 315. The display range 311 is a white part in the figure, and indicates a displayed (that is, not to be clipped by the gamma unit 2) luminance range in the range of the input HDR image. The clipping range 312 is a gray part in the figure, and indicates a range clipped by the gamma unit 2 in the adjustable range. When the user changes the user adjustment value of the clipping threshold via the operation unit 9 in a decreasing direction, a width of the display range 311 becomes narrower and a width of the clipping range 312 becomes wider. On the other hand, when the user adjustment value of the clipping threshold is changed in an increasing direction, the width of the display range 311 becomes wider and the width of the clipping range 312 becomes narrower.

The MaxFALL value 313 and the MaxCLL value 314 respectively plot the MaxFALL value and the MaxCLL value acquired from the metadata acquirer 3. The MaxFALL value and the MaxCLL value vary when the HDR image (content) changes, and thus each plotted position varies to the left or right accordingly. The maximum display luminance 315 plots the maximum display luminance acquired by the display luminance acquirer 7. The maximum display luminance also varies as the display condition of display unit 5 changes, and thus a plotted position varies left and right accordingly.

The user adjustment value 302 indicates the above-described clipping threshold, and corresponds to an upper limit luminance (right end in the figure) of the display range 311. When 1000 nits is displayed as the user adjustment value 302, it is indicated that even if code values of 1000 nits or more are input, all the code values 1000 nits or more are processed as 1000 nits. When the user changes the clipping threshold via the operation unit 9, the value displayed as the user adjustment value 302 changes, and the widths of the display range 311 and of the clipping range 312 vary accordingly.

The MaxFALL legend 303 displays an identification mark Δ of the MaxFALL value 313 in the indicator 301 and the MaxFALL value acquired from the metadata acquirer 3. The MaxCLL legend 304 displays an identification mark ◇ of the MaxCLL 314 in the indicator 301 and the MaxCLL value acquired from the metadata acquirer 3. The maximum display luminance legend 305 displays an identification mark ○ of the maximum display luminance 315 in the indicator 301 and the maximum display luminance acquired from the display luminance acquirer 7.

According to the HDR range adjustment menu configured as described above, the user can acquire the clipping threshold, that is, an index to be referred to at the time of adjusting the display range 311, and thus convenience of the adjustment by the user improves. FIG. 3 illustrates a state where the MaxCLL value is 1200 nits, the maximum luminance of the input HDR image is 1200 nits, and the display range 311 is 1000 nits. Thus, the luminance of 1000 nits or more is saturated and gradation loss occurs. Since the maximum display luminance is 2000 nits, a luminance of 1000 nits or less is displayed in a doubled luminance. From this state, the user adjusts the display range 311 according to a viewing environment and user's preference. A description will be given of an example of the adjustment with reference to FIGS. 4A to 4D.

Figure 4A:
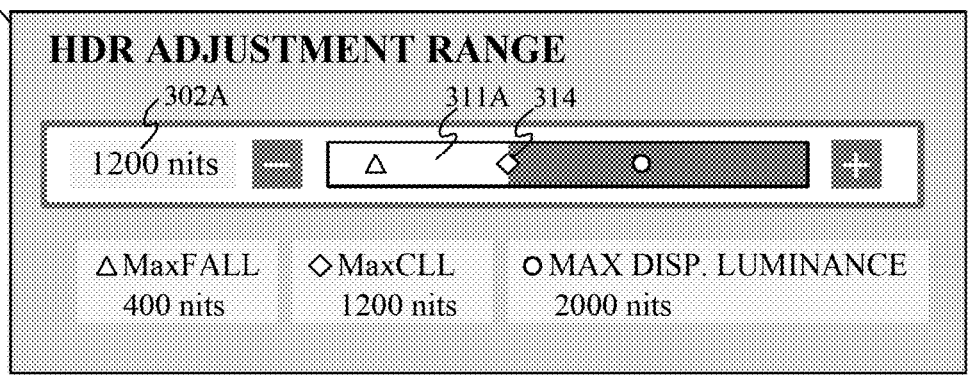
FIGS. 4A to 4D are diagrams illustrating examples of adjusting an HDR range according to the first embodiment.

An HDR range adjustment menu 300A illustrated in FIG. 4A is an example of an adjustment when the user does not want to saturate the luminance of 1000 nits or more, but wants to display a brighter image rather than faithfully reproducing a luminance because the viewing environment is bright. As indicated by a display range 311A, a user adjustment value 302A is set to be matched with the MaxCLL 314 (=1200 nits). Thereby, the display luminance is 2000 nits for the input luminance of 1200 nits, and thus the display luminance for the input luminance is about 1.67 times.

Figure 4B:
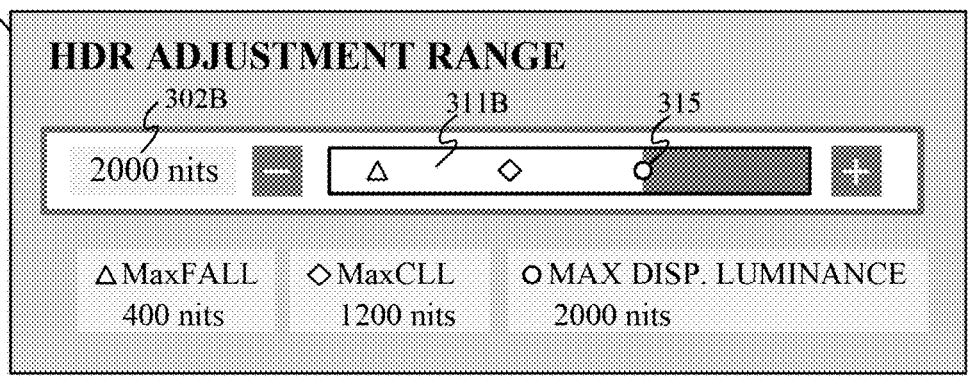

An HDR range adjustment menu 300B illustrated in FIG. 4B is an example of an adjustment when the viewing environment is good and a faithful luminance expression is desired. As indicated by a display range 311B, a user adjustment value 302B is set to be matched with the maximum display luminance of 2000 nits. Thereby, the display luminance is 2000 nits for the input luminance of 2000 nits, and thus the input luminance is equal to the display luminance.

Figure 4C:
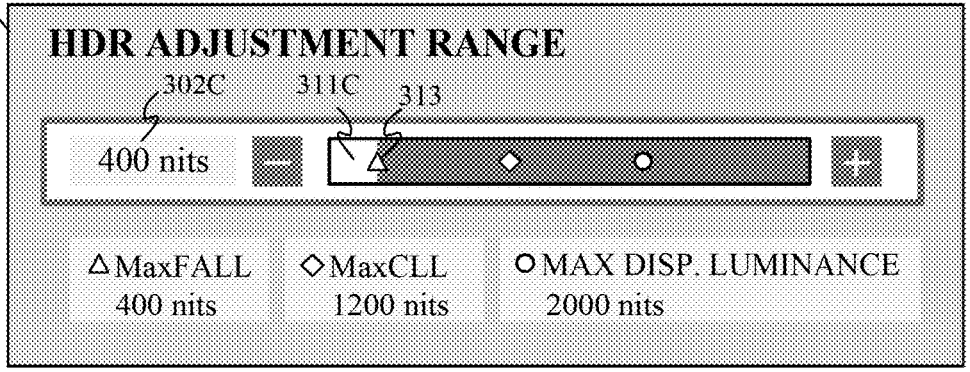

An HDR range adjustment menu 300C illustrated in FIG. 4C is an example of an adjustment when the user wants a view as an HDR image but the viewing environment is very bright. As indicated by a display range 311C, an adjustment value 302C is set to be matched with the MaxFALL 313 (=400 nits). Thereby, the display luminance is 2000 nits for the input luminance of 400 nits, and thus the display luminance for the input luminance is about 5 times. If an adjustment value in the vicinity of this is selected, the gradation loss may frequently occur in bright part of this HDR image content.

Figure 4D:
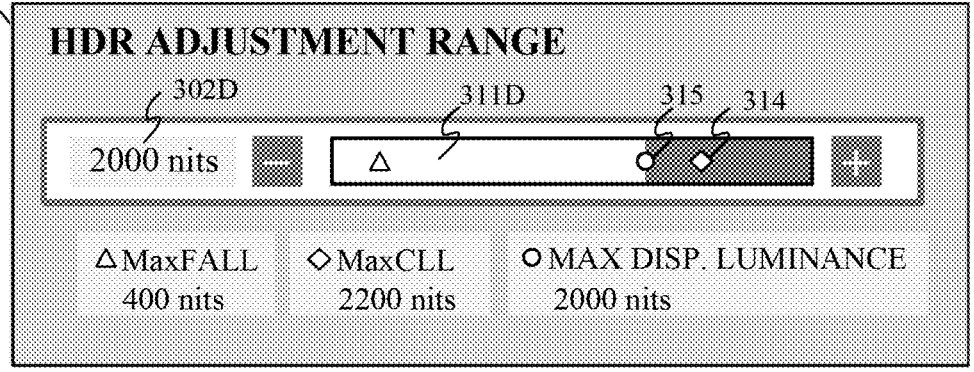

An HDR range adjustment menu 300D illustrated in FIG. 4D is an example of an adjustment when the MaxCLL 314 (=2200 nits) exceeds the maximum display luminance of 2000 nits. Since the display luminance is 2000 nits for the input luminance of 2000 nits, the input luminance and the display luminance are equal, but the luminance of 2000 to 2200 nits is saturated and the gradation loss occurs. Although the gradation loss occurs in a high luminance range, the luminance is faithfully expressed in most ranges.

As described above, this embodiment displays the information (indicator) indicating the relative relation among the MaxCLL value, the MaxFALL value, the user adjustment value of the clipping threshold and the maximum display luminance on the same screen that displays the HDR range adjustment menu. Hence, the user can set the user adjustment value using the indicator as an index. Both the MaxCLL value and the MaxFALL value may be displayed on the indicator, but displaying only one of them may be a sufficient index.

The gamma unit 2, the metadata acquirer 3, the OSD superimposing unit 4, the gamma controller 6, the display luminance acquirer 7 and the HDR range adjustment menu unit 8 may be provided on a computer such as a CPU or an MPU, and the above-described processing (control method) may be executed according to a computer program.

Second Embodiment

The second embodiment according to the present invention will be described with reference to FIGS. 5 and 6A to 6C. This embodiment is the same as the first embodiment except an HDR range adjustment menu generated by the HDR range adjustment menu unit 8. In the second embodiment, in order to encourage the user to understand a relation between the input luminance and the display luminance (output luminance), a display is added of an input/output luminance graph indicating the relation.

Figure 5:
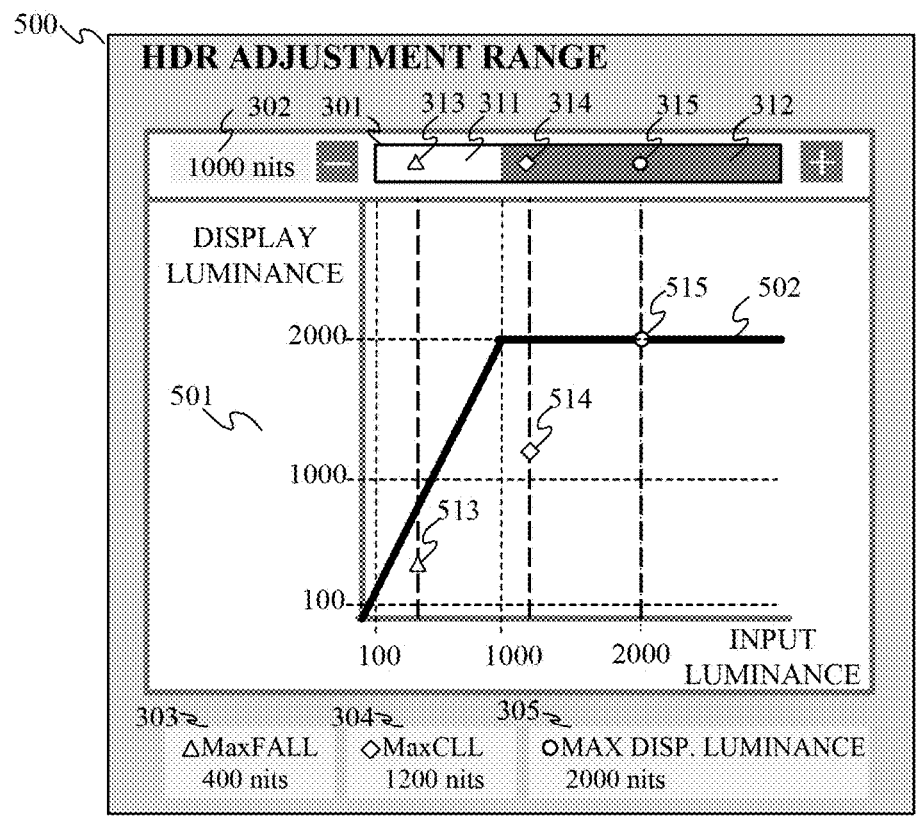
FIG. 5 is a diagram illustrating an HDR range adjustment menu according to a second embodiment of the present invention.

FIG. 5 illustrates an example of the HDR range adjustment menu in this embodiment. An HDR range adjustment menu 500 includes the indicator 301, an input/output luminance graph 501, the user adjustment value 302, the MaxFALL legend 303, the MaxCLL legend 304, and the maximum display luminance legend 305. The configurations other than the input/output luminance graph 501 are the same as those described in the first embodiment.

The input/output luminance graph 501 is a graph in which a horizontal axis represents the input luminance and a vertical axis represents the display luminance, and includes an input/output luminance line 502, an MaxFALL value 513, an MaxCLL value 514, and a maximum display luminance 515. FIG. 5 aligns ranges of the indicator 301 and of the input/output luminance graph 501 in a horizontal direction by matching each legend on the indicator 301 and on the input/output luminance graph 501 in the vertical direction.

The input/output luminance line 502 represents the relation between the input luminance of the input HDR image and the display luminance of the display unit 5. Similarly to the first embodiment, this embodiment uses a gamma curve that simply clips the input luminance equal to or higher than the clipping threshold (user adjustment value 302) as illustrated in FIG. 2. Thus, the input luminance equal to or higher than the user adjustment value 302 is uniformly displayed in the maximum display luminance. When a method is used of compressing the input luminance instead of simply clipping it, an input/output luminance line according to the relation thereof may be displayed.

When the user changes the user adjustment value 302 in the decreasing direction via the operation unit 9, of the input/output luminance line 502, a horizontal line part indicating the clipping threshold extends to the left and an inclination of an inclined part increases. When the user adjustment value 302 is changed in the increasing direction, the horizontal line part shortens to the right and the inclination of the inclined part decreases.

The MaxFALL value 513 and the MaxCLL value 514 plot the MaxFALL value and the MaxCLL value acquired by the metadata acquirer 3, respectively. The maximum display luminance 515 plots the maximum display luminance acquired by the display luminance acquirer 7. Each of these plotted values may be easy to understand each positional relation with a corresponding plot in the indicator 301 by using a broken line or the like as illustrated in the figure. Each plotted position in the graph is a position where the relation between the input and output luminance is 1:1. Thereby, the user can understand how much gain is applied at a glance from the positional relation between the plotted position and the input/output luminance line 502. FIG. 5 merely illustrates an example, and other display methods may be used such as plotting those on the input/output luminance line 502.

Similarly to the first embodiment, a description will be given of display examples of the input/output luminance graph 501 according to the user's adjustment of the display range 311 (user adjustment value 302) with reference to FIGS. 6A to 6C. These display examples correspond to the examples described in the first embodiment with reference to FIGS. 4A to 4C. That is, each description will be given of a case where the user adjustment value 302 is set to be matched with the MaxCLL value 314, of a case where the user adjustment value 302 is set to be matched with the maximum display luminance 315, and of a case where the user adjustment value 302 is set to be matched with the MaxFALL value 313.

Figure 6A:
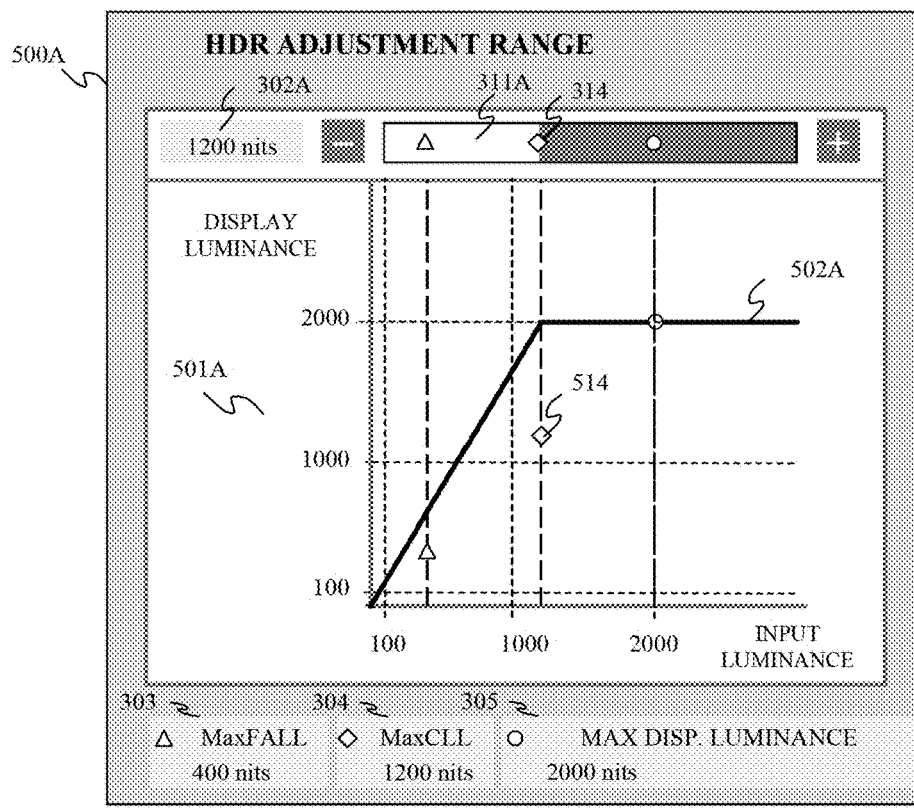
FIGS. 6A to 6C are diagrams illustrating examples of adjusting an HDR range according to the second embodiment.

An HDR range adjustment menu 500A illustrated in FIG. 6A corresponds to the HDR range adjustment menu 300A illustrated in FIG. 4A to which an input/output luminance graph 501A is added. The input/output luminance line 502A has an inclination of 1.67 for the input luminance of 1200 nits or less, and takes a constant value 2000 nits due to saturation for the input luminance of 1200 nits or more. Since the inclination of the input/output luminance line 502A is maintained to an intersection with the broken line at the MaxCLL value 514, it can be understood at a glance that the gradation loss does not occur in the input HDR image content. Since the inclination is large and the input/output luminance line 502A exceeds the MaxCLL value 514 plotted at the position where the input/output luminance ratio of 1:1, it is possible to easily read how much gain is applied, from the inclination degree. It is not illustrated but a numerical value indicating a gain value may be displayed so that an amount of the gain can be understood at a glance.

Figure 6B:
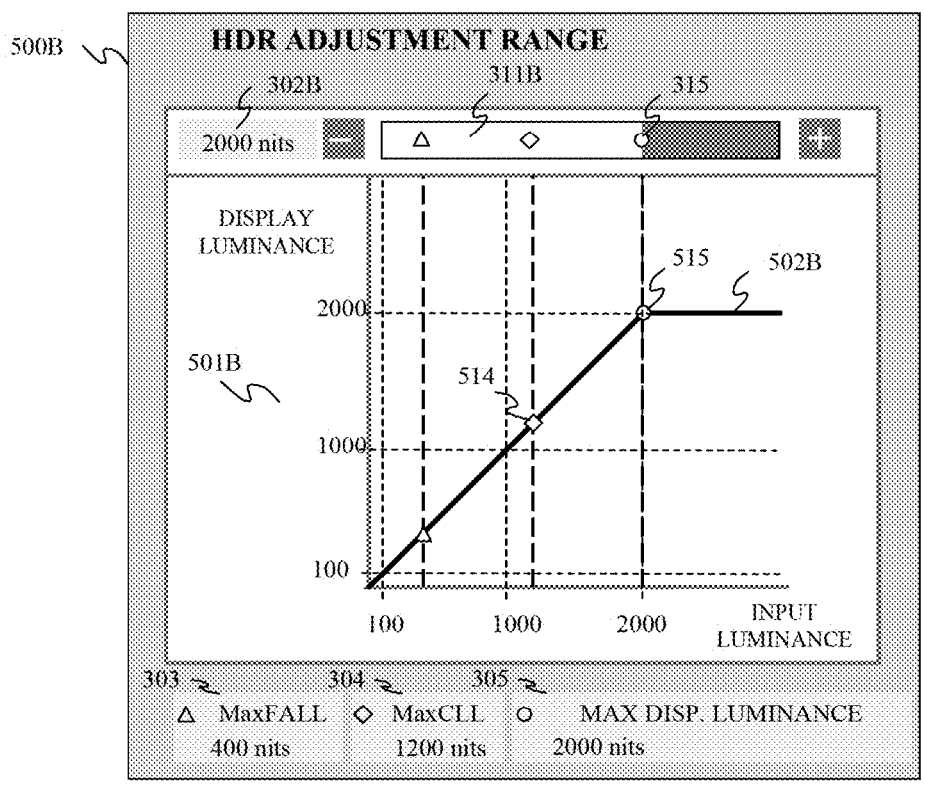

An HDR range adjustment menu 500B illustrated in FIG. 6B corresponds to the HDR range adjustment menu 300B illustrated in FIG. 4B to which an input/output luminance graph 501B is added. The input/output luminance line 502B has an inclination of 1 for the input luminance of 2000 nits or less, and takes a constant value 2000 nits due to saturation for the input luminance of 2000 nits or more. Since the input/output luminance line 502B intersects with the maximum display luminance 515 plotted at the position where the input/output luminance ratio is 1:1 while maintaining its inclination, it can be read at a glance that the input/output luminance ratio is 1:1. Since the input/output luminance line 502B intersects with the MaxCLL value 514 while maintaining its inclination, it can be understood at a glance that the faithful luminance expression can be made for the input HDR image content.

Figure 6C:
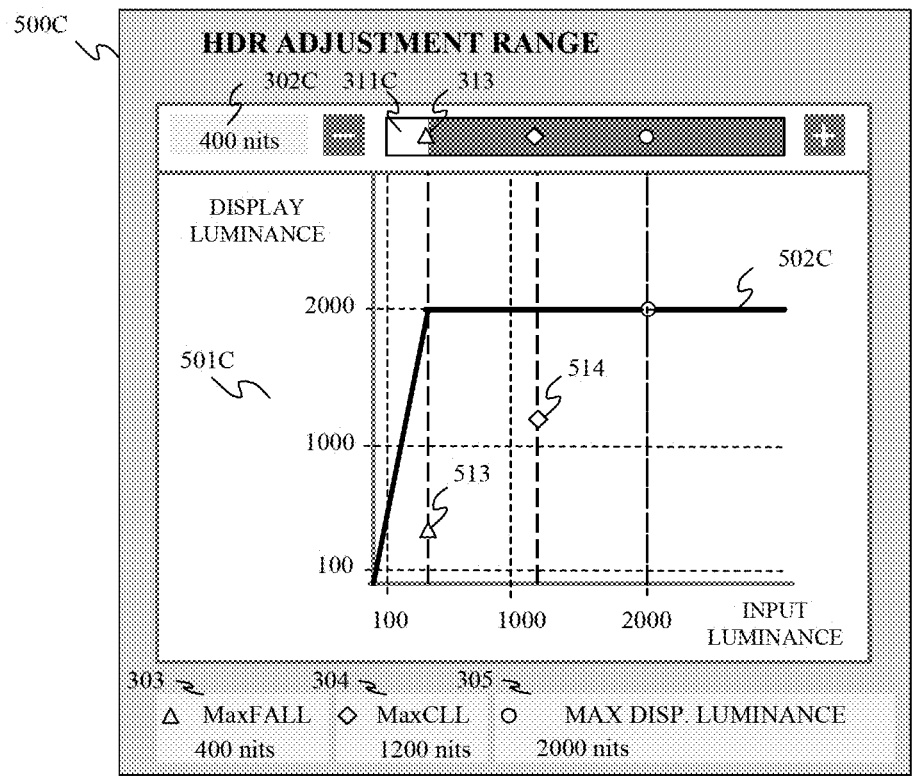

An HDR range adjustment menu 500C illustrated in FIG. 6C corresponds to the HDR range adjustment menu 300C illustrated in FIG. 4C to which an input/output luminance graph 501C is added. The input/output luminance line 502C has an inclination of 5 for the input luminance of 400 nits or less, and takes a constant value 2000 nits due to saturation for the input luminance of 400 nits or more. Since the inclination of the input/output luminance line 502C is not maintained at the intersection with the broken line at the MaxCLL value 514, it is possible to understand at a glance that the gradation loss occurs in the input HDR image content. Since the inclination of the input/output luminance line 502C is maintained to the intersection with the broken line at the MaxFALL value 513, it can be easily read that the gradation loss does not occur for the input luminance below the maximum value of a frame average light level.

As described above, this embodiment displays the indicator indicating the relative relation among the MaxCLL value, the MaxFALL value, the user set value of the clipping threshold and the maximum display luminance, and the graph indicating the relation between the input luminance and the display luminance, on the same screen displaying the HDR range adjustment menu. Thereby, the user can set the user adjustment value by using the indicator and the graph as indexes, and can easily understand what process is applied for the setting of the user adjustment value.

Hereinafter, the next embodiment according to the present invention will be described with reference to figures.

Third Embodiment

Figure 7:
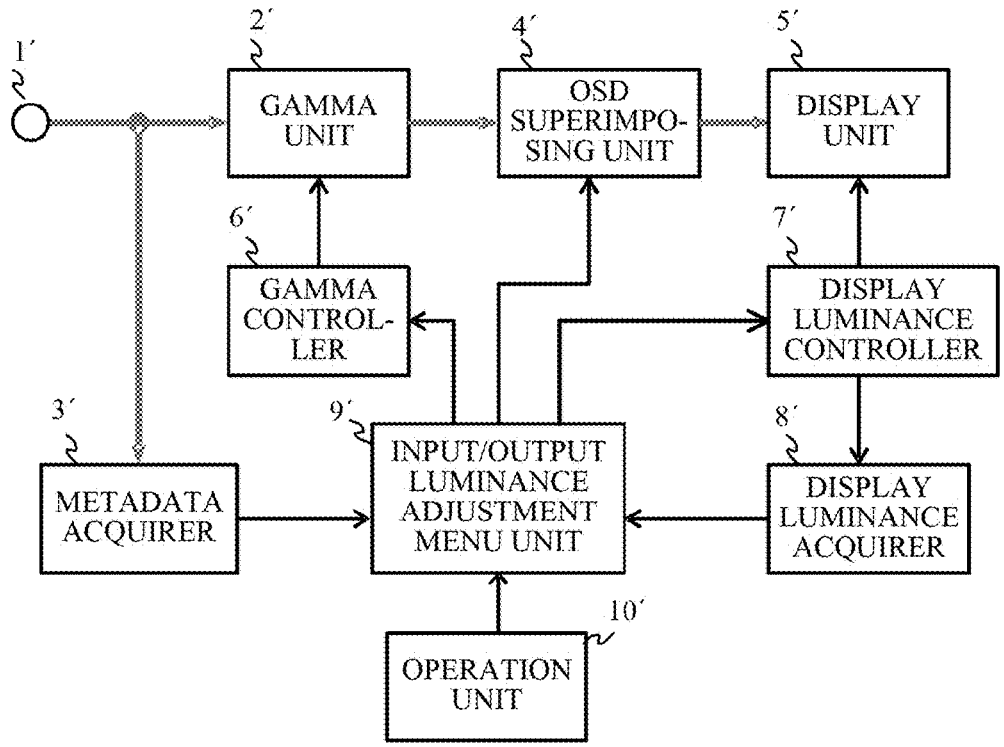
FIG. 7 is a block diagram illustrating a configuration of an image display apparatus according to a third embodiment of the present invention.

FIG. 7 illustrates a configuration of an image display apparatus that is a third embodiment according to the present invention. The image display apparatus includes a projector (image projection apparatus) and a direct view display.

The image display apparatus in this embodiment includes an image input unit 1', a gamma unit 2', a metadata acquirer 3', an OSD superimposing unit 4', a display unit 5', a gamma controller 6', a display luminance controller 7', a display luminance acquirer 8', an input/output luminance adjustment menu unit 9' and an operation unit 10'. The gamma unit 2', the metadata acquirer 3', the OSD superimposing unit 4', the gamma controller 6', the display luminance controller 7', the display luminance acquirer 8' and the input/output luminance adjustment menu unit 9' are configured by a single or a plurality of computer(s) such as a CPU or an MPU, and each of them is configured to execute each processing according to a computer program.

The image input unit (input unit) 1' includes a terminal for receiving an HDR image (input image) input as an image signal from an Ultra HD Blu-Ray player, a computer, or the like, for example, an HDMI® terminal for which an HDR image transmission/reception is defined as a standard. The HDMI is merely an example, and a terminal of another standard such as DisplayPort may be used as long as it is possible to transmit/receive the HDR image and metadata described later. For an HDR image, an EOTF (Electro-Optical Transfer Function) indicating a relation between a code value and a luminance is defined. As this EOTF, HDMI uses SMPTE ST2084 standardized by Society of Motion Picture and Television Engineers (SMPTE). ST2084 defines code values for luminance up to 10,000 nits. This embodiment will be described on a premise that the EOTF of ST2084 is used, but another EOTF may be used.

The gamma unit 2' has a lookup table, and is configured to convert the EOTF of the HDR image input from the image input unit 1' into a reference EOTF, and to output the image converted into the reference EOTF. The EOTF of the HDR image corresponds to a first EOTF for a first dynamic range defined for the HDR image. The reference EOTF corresponds to a second EOTF defined for a second dynamic range in which a maximum luminance is lower than that in the first dynamic range. The reference EOTF is an EOTF that is a standard in the image display apparatus and that is set by the gamma controller 6', and in this embodiment, the reference EOTF is a curve of a gamma 2.2 which is an EOTF of an SDR image. The gamma unit 2' and the gamma controller 6' configure a converting unit.

The gamma 2.2 is merely an example, and a gamma 2.4 or a completely different curve with a consideration of characteristics of the display unit 5' may be used. The lookup table may be able to extend a tone (luminance) by 2 bits or more for each color of RGB so as not to cause a gradation loss.

The metadata acquirer 3' is configured to read information relating to luminance of the HDR image from metadata input as additional information for the HDR image from the image input unit 1'. The information relating to luminance includes a MaxCLL (Maximum Content Light Level) and a MaxFALL (Maximum Frame-Average-Light Level) each of which is defined by 861.3A standardized by Consumer Technology Association (CTA). However, the MaxCLL and the MaxFALL are merely examples, and other information may be used as long as the information relates to the luminance of the HDR image. The metadata acquirer 3' is configured to output the read information relating to luminance (hereinafter also referred to as luminance information) to the input/output luminance adjustment menu unit 9'.

The OSD superimposing unit 4' is configured to superimpose an image indicating the input/output luminance adjustment menu screen (setting screen) output from the input/output luminance adjustment menu unit 9' onto the image output from the gamma unit 2'. The input/output luminance adjustment menu screen is displayed for allowing a user to perform an operation of changing setting values relating to the luminance described later of the image display apparatus in conjunction with the operation unit 10'.

The configuration of the display unit (display unit) 5' is different depending on a type of the image display apparatus. When the image display apparatus is a projector (image projection apparatus), the display unit 5' is configured to drive a light modulation element according to the image from the OSD superimposing unit 4', to generate an image light by modulating an illumination light from a light source, which is an illumination unit, at a light modulation element and to project the image light via a projection optical system onto a projection surface such as a screen. Thereby, a projection image is displayed on the projection surface. A liquid crystal panel, a digital micromirror device, or the like is used as the light modulation element. When the image display apparatus is a direct view display, the display unit 5' displays an image on an image display surface (display screen) by driving the light modulation element according to the image from the OSD superimposing unit 4'. A liquid crystal panel, an organic EL element, or the like is used as the light modulation element.

The display unit 5' is also configured to convert the reference EOTF according to a VT (display luminance with respect to an input voltage) characteristic of the light modulation element into a voltage to be applied to the light modulation element. The display unit 5' can display an image under various display conditions (also referred to as display parameters or display states). The display condition here is a condition that changes a display luminance (output luminance), which is the luminance of the image to be displayed, and, in a projector, includes a light emission intensity (light amount) of the light source and an aperture value (F-number), a zoom position and a focus position of the projection optical system, and the like. In a direct view liquid crystal display, the display condition includes a light emission intensity of a backlight. In this embodiment, a degree of the light emission intensity of the light source or the backlight is referred to as an illumination luminance level. The display luminance controller 7' is configured to control the illumination luminance level.

ST2084 described above supports luminance up to 10,000 nits, but in practice, there are few cases in which such a high luminance is required, and in most cases, 1,000 to 3,000 nits is sufficient. In this embodiment, the maximum output luminance is set to 3,000 nits for the image display apparatus. Via the operation unit 10', it is possible to perform an output luminance adjustment for adjusting the output luminance according to a display condition (user set display condition) as a user set value set by the user. That is, even if the tone input to the display unit 5' is the same, the output luminance varies according to the output luminance adjustment.

The gamma controller (set value acquiring unit) 6' is configured to generate a gamma curve to be set for the lookup table of the gamma unit 2' according to an input tone threshold as a user set value input via the operation unit 10'. Since the EOTF of ST2084 is coded with an absolute luminance, it is necessary to clip or compress an input luminance (input tone) that exceeds the display luminance. In this embodiment, the input tone exceeding the display luminance is clipped in order to simplify a description. The gamma curve set by the gamma controller 6' for the gamma unit 2' is generated as a curve that clips a range higher than the input tone threshold (which is a user set maximum luminance and is hereinafter referred to as a clipping threshold), and on the other hand, that maps a range equal to or lower than the clipping threshold so as to match with the EOTF of the gamma 2.2 (curve acquired by multiplying the EOTF of ST2084 by the inverse gamma of the gamma 2.2). The clipping threshold is the maximum input tone that is not clipped.

A description will be given of the gamma curve generated by the gamma controller 6' with reference to FIG. 2. FIG. 2 illustrates five types of gamma curves 2a to 2e set for the gamma unit 2', each of which indicates each relation between the input tone and an output tone (luminance). As described above, in this embodiment, since the output tone is expanded by 2 bits for the input tone, an input of 10 bits becomes an output of 12 bits.

The gamma curve 2a is a gamma curve of 100 nits, is set so that the output tone becomes the maximum value at a code value (input tone) corresponding to 100 nits, and so that, for code values below that code value, the relation between the input tone and the output tone becomes a curve acquired by multiplying the EOTF of ST2084 by the inverse gamma of the gamma 2.2.

Similarly, the gamma curves 2b, 2c, 2d, and 2e are respectively set so that the output tones become the maximum values at code values corresponding to 500 nits, 1000 nits, 2000 nits, and 3000 nits, and so that, for code values below those code values, the curves are acquired by multiplying the EOTFs of ST2084 by the inverse gamma of the gamma 2.2. Thus, if the illumination luminance level of the display unit 5' is adjusted so that the output luminance of the projector becomes 2,000 nits, the tone of 2,000 nits or less of the image input by the EOTF of ST2084 is output in a faithful luminance.

The five types of gamma curves of 100 nits to 3,000 nits illustrated in FIG. 2 are examples, and the number and range of gamma curves generated by the gamma controller 6' may be other than the above examples. Since the display luminance may be doubled by projecting an image onto a same projection position from two projectors, the maximum value of the clipping threshold of the gamma curve generated by the gamma controller 6' may exceed the maximum output luminance of each projector.

As a method of generating a gamma curve, there are various methods such as a method of storing set values of setting points of the lookup table of the gamma unit 2' as an array in a control program for the number of gamma curves in advance, and a method of generating the gamma curve by an arithmetic expression.

The display luminance controller (setting condition acquiring unit) 7' is configured to acquire the user set value (user set display condition) of the illumination luminance level via the operation unit 10', and to control (adjust) the illumination luminance level in the display unit 5' in 1% units in a range of 10% to 100%. The range and the unit of the illumination luminance level are merely examples, and other ranges and units may be used. The relation between the display luminance of the image displayed by the display unit 5' and the illumination luminance level may be linear or non-linear.

The display luminance acquirer (luminance acquisition unit) 8' is configured to acquire a maximum display luminance of the image display apparatus according to various illumination luminance levels (that is, display conditions) changed by the display luminance controller 7', and to output the maximum display luminance to the input/output luminance adjustment menu unit 9'. The maximum display luminance indicates a luminance value of the display screen when an all-white image (image with the maximum tone as a whole) is input from the OSD superimposing unit 4' to the display unit 5'.

The display luminance acquirer 8' is, for example, configured to store the maximum display luminance corresponding to the various illumination luminance levels on a memory such as a nonvolatile memory (not illustrated) in advance, and to acquire a maximum display luminance corresponding to an actual illumination luminance level by reading it from the memory. In this case, the maximum display luminance of various illumination luminance levels may be measured by using a luminance sensor during a manufacturing process of the image display apparatus, and the measurement result may be stored on the memory. The display luminance acquirer 8' may calculate and acquire the maximum display luminance corresponding to the actual illumination luminance level by using, for example, an arithmetic expression that can calculate the maximum display luminance corresponding to the various illumination luminance levels.

The input/output luminance adjustment menu (generating unit) 9' is configured to generate an input/output luminance adjustment menu screen (setting screen) for allowing the user to adjust (set) an input luminance range, that is the luminance range of the input HDR image, and the illumination luminance level, via the operation unit 10'. The input/output luminance adjustment menu screen is output to the OSD superimposing unit 4'.

The OSD superimposing unit 4' is configured to superimpose the input/output luminance adjustment menu screen on the image signal and to output it to the display unit 5'. The input/output luminance adjustment menu screen displays the MaxCLL and the MaxFALL acquired by the metadata acquirer 3' and the maximum display luminance acquired by the display luminance acquirer 8' on the same screen to display a relative relation with the illumination luminance level, in order to assist a user's adjustment work.

Figure 8:
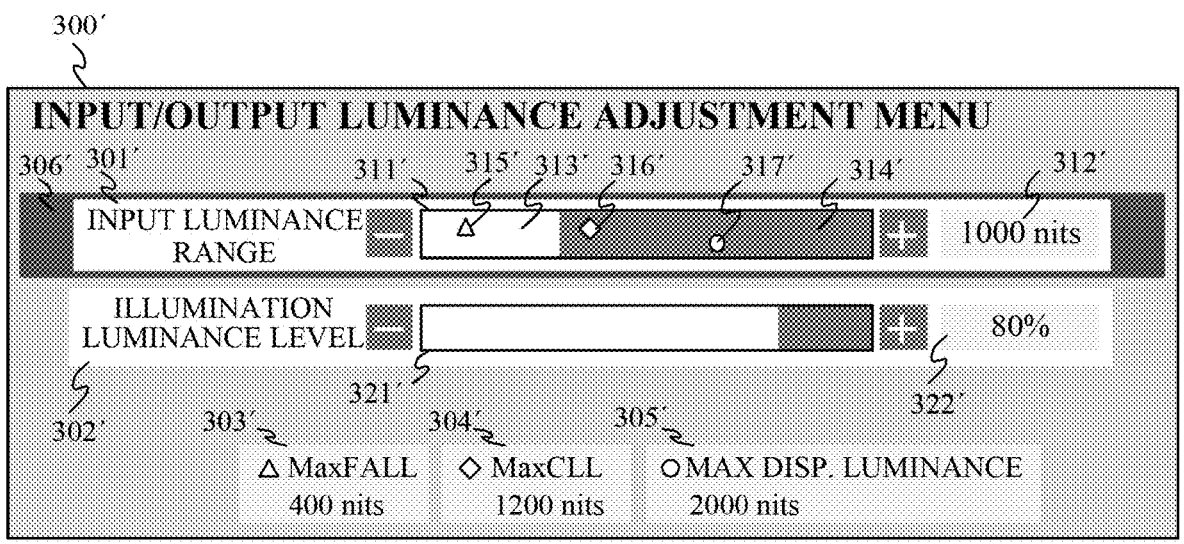
FIG. 8 is a diagram illustrating an example of an input/output luminance adjustment menu according to the third embodiment.

FIG. 8 illustrates an example of the input/output luminance adjustment menu screen 300'. The input/output luminance adjustment menu screen 300' includes an input luminance range column (first set area) 301', an illumination luminance level column (second set area) 302', a MaxFALL legend 303', a MaxCLL legend 304', a maximum display luminance legend 305', and a column selecting frame 306'.

The column selecting frame 306' is displayed to surround a column including an item in an operation waiting state (item that can be set) of either the input luminance range column 301' or the illumination luminance level column 302'. FIG. 8 illustrates the operation waiting state for increasing/decreasing the item (input luminance range 313') of the input luminance range column 301'. When the user operates up/down buttons of the operation unit 10', the column selecting frame 306' switches to a state surrounding the input luminance range column 301' and to a state surrounding the illumination luminance level column 302'.

The input luminance range column 301' displays an input luminance range indicator 311' and an input luminance range adjustment value 312'. The input luminance range indicator 311' includes the input luminance range 313', a clipping range 314', a MaxFALL value 315', a MaxCLL value 316', and a maximum display luminance value 317', each of which is displayed as an index. These indexes are information indicating a relative relation among the input luminance range (clipping threshold) 313', the maximum display luminance value 317', the MaxFALL value 315' and the MaxCLL value 316'.

The input luminance range 313' is displayed as a white part in the input luminance range indicator 311' and indicates a displayed (that is, not clipped by the gamma unit 2') luminance range of the input luminance range of the HDR image. The clipping range 314' is displayed as a gray part in the input luminance range indicator 311' and indicates the luminance range of the input luminance range that is clipped by the gamma unit 2'. As illustrated in FIG. 8, when the user operates the operation unit 10' in an increasing direction (presses a plus button) while the input luminance range column 301' is surrounded by the column selecting frame 306', the white part becomes wider and the gray part becomes narrower. When the operation unit 10' is operated in a decreasing direction (a minus button is pressed), the white part becomes narrower and the gray part becomes wider.

The input luminance range adjustment value 312' displays a maximum value of the input luminance range 313' numerically in conjunction with the input luminance range indicator 311'. When 1000 nits is displayed as the input luminance range adjustment value 312', even if a code value of 1000 nits or more is input, all the code values of 1000 nits or more are processed as 1000 nits.

The MaxFALL value 315' and the MaxCLL value 316' displays the MaxFALL value and the MaxCLL value acquired from the metadata acquirer 3' with indexes Δ and ◇, respectively. The MaxFALL value 315' and the MaxCLL value 316' varies when the content of the HDR image is changed, and thus the display positions moves left and right accordingly.

The maximum display luminance value 317' displays the maximum display luminance value acquired from the display luminance acquirer 8' with an index ○. The maximum display luminance value 317' varies when the illumination luminance level is changed by the display luminance controller 7', and thus the display position moves to the left and right accordingly.

The input luminance range column 301' illustrated in FIG. 8 is merely an example, and the relative relation among the input luminance range 313', the clipping range 314', the MaxFALL value 315', the MaxCLL value 316', and the maximum display luminance value 317' may be displayed in a form that can be visually recognized by the user.

The illumination luminance level column 302' displays an illumination luminance level indicator 321' and an illumination luminance level value 322'. The illumination luminance level indicator 321' displays a relation between a range of the illumination luminance level (10% to 100%) that can be set by the user and a currently set illumination luminance level (user set display luminance) so as to allow the user to visually recognize the relation. The illumination luminance level value 322' represents a current user set display luminance in %. When the user operates the operation unit 10' in the increasing direction in the state where the illumination luminance level column 302' is surrounded by the column selecting frame 306', the illumination luminance level value 322' increases, a white part becomes wider and a gray part becomes narrower. Accordingly, the maximum display luminance value 317' in the input luminance range indicator 311' moves to the right. When the operation unit 10' is operated in the decreasing direction, the illumination luminance level value 322' decreases, the white part becomes narrower and the gray part becomes wider. Accordingly, the maximum display luminance value 317' in the input luminance range indicator 311' moves to the left.

The illumination luminance level column 302' illustrated in FIG. 8 is merely an example, and other display forms may be used. The illumination luminance level may be set in stages such as high, medium and low instead of being set in 1% units as described above.

The MaxFALL legend 303' displays the index (symbol) Δ of the MaxFALL value 315' in the input luminance range indicator 311' and the MaxFALL value acquired from the metadata acquirer 3'. The MaxCLL legend 304' displays the index ◇ of the MaxCLL value 316' in the input luminance range indicator 311' and the MaxCLL value acquired from the metadata acquirer 3'. The maximum display luminance legend 305' displays the index ○ of the maximum display luminance value 317' in the input luminance range indicator 311' and the maximum display luminance value acquired from the display luminance acquirer 8'.

As described above, this embodiment displays the input luminance range column 301' for the user to perform an increase/decrease operation on the input luminance range and the illumination luminance level column 302' for the increase/decrease operation on the illumination luminance range (maximum display luminance) on the same screen called the input/output luminance adjustment menu screen 300'. Thereby, the user can easily perform an adjustment to balance the input luminance range and the maximum display luminance.

In the state illustrated in FIG. 8, since the illumination luminance level value 322' is 80%, the maximum display luminance value 317' is 2000 nits. On the other hand, since the input luminance range adjustment value 312' is 1000 nits, the output luminance is doubled for the input luminance of 1000 nits or less. Since the MaxCLL value is 1200 nits, the maximum input luminance of the HDR image is 1200 nits. On the other hand, since the input luminance range adjustment value 312' is 1000 nits, the input luminance of 1000 nits or more is saturated, which causes the gradation loss. From this state, the user performs the increase/decrease operation (adjustment) on the input luminance range adjustment value 312' and the illumination luminance level value 322' according to a viewing environment and a preference.

An example of an adjustment will be given of when the faithful luminance is expressed for an input HDR image with reference to FIG. 9.

Figure 9:
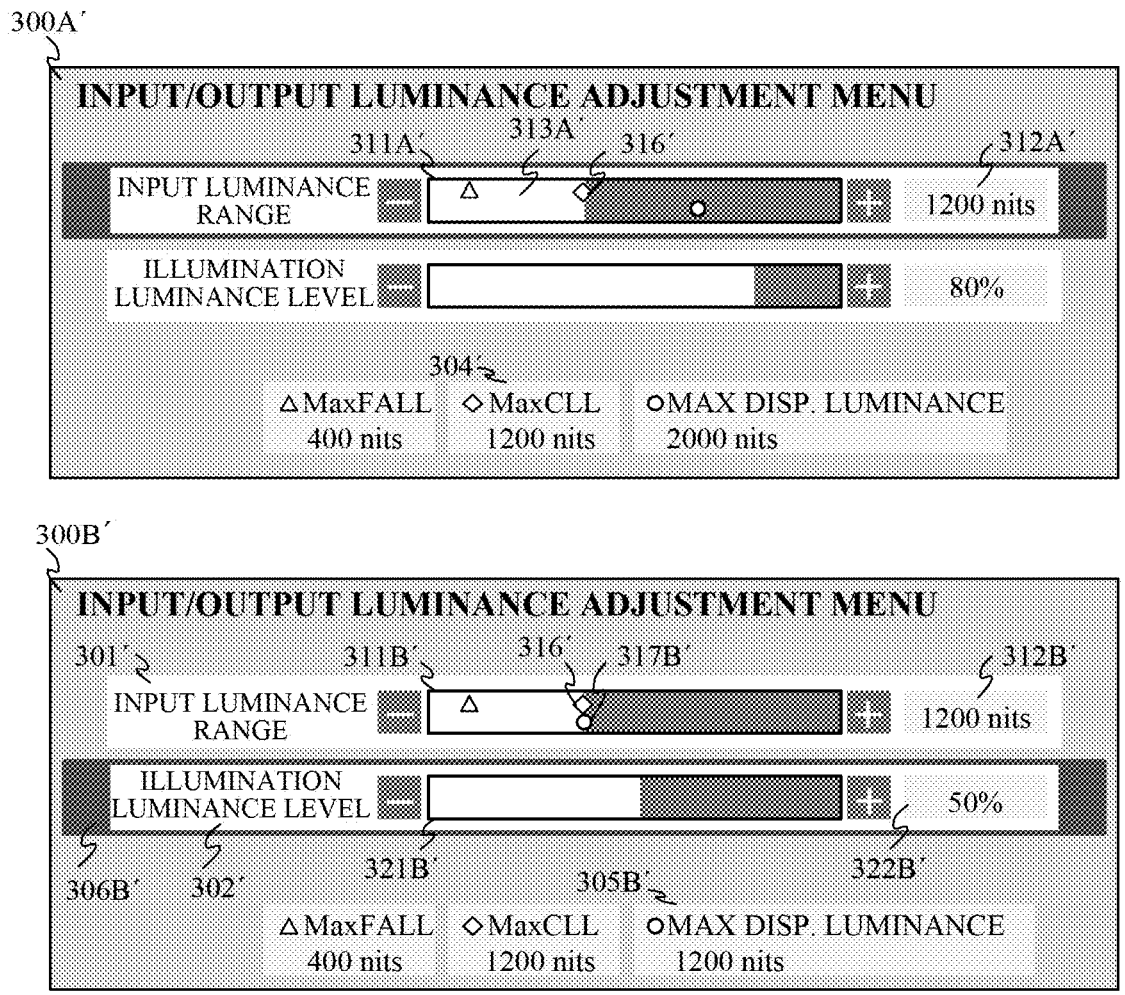
FIG. 9 is a diagram illustrating an example of an input/output luminance adjustment according to the third embodiment.

FIG. 9 illustrates a first adjustment, that is the input luminance range adjustment on the input luminance range indicator 311', and a next adjustment, that is the illumination luminance level adjustment on the illumination luminance level indicator 321'. An upper side of FIG. 9 is an input/output luminance adjustment menu screen 300A' that indicates a first input luminance range adjustment. Via the operation unit 10', the user increases an input luminance range 313A' to match the MaxCLL value 316 as indicated by an input luminance range indicator 311A'. Thereby, an input luminance range adjustment value 312A' becomes equal to the MaxCLL value of 1200 nits indicated in the MaxCLL legend 304'. By this adjustment, the maximum display luminance for the maximum input luminance of 1200 nits is 2000 nits, that is, about 1.67 times.

A lower side of FIG. 9 is an input/output luminance adjustment menu screen 300B' that indicates a next illumination luminance level adjustment. The user operates the down button of the operation unit 10' to move the column selecting frame 306B' to a position surrounding the illumination luminance level column 302'. Thereafter, the user operates the operation unit 10' to decrease an illumination luminance level value 322B' until a maximum display luminance value 317B' moves to the same position as that of the MaxCLL value 316'. In this example, the maximum display luminance value 317B' reaches the same position as that of the MaxCLL value 316' when the illumination luminance level value 322B' is reduced to 50%.

By performing the above adjustment, it is possible to set the maximum display luminance to 1200 nits that matches the maximum input luminance of 1200 nits. Consequently, since the input luminance and the display luminance become equal to each other, it is possible to reproduce the display image in which the luminance expression is faithful to the input HDR image.

Although this embodiment displays the maximum display luminance value 317' on the input luminance range indicator 311', the input luminance range may be displayed on the illumination luminance level indicator 321' so as to indicate a relative relation between the input luminance range and the illumination luminance level. Similarly, the MaxFALL value 315' and the MaxCLL value 316' may be displayed on the illumination luminance level indicator 321' so as to indicate a relative relation between them and the illumination luminance level.

This embodiment displays all of the MaxCLL value, the MaxFALL value, and the maximum display luminance value, but these values may not necessarily be displayed. That is, even if these values are not displayed, by displaying the input luminance range column and the illumination luminance level column on the same menu screen, it is possible to improve convenience of the input/output luminance adjustment by the user.

Fourth Embodiment

Figure 10:
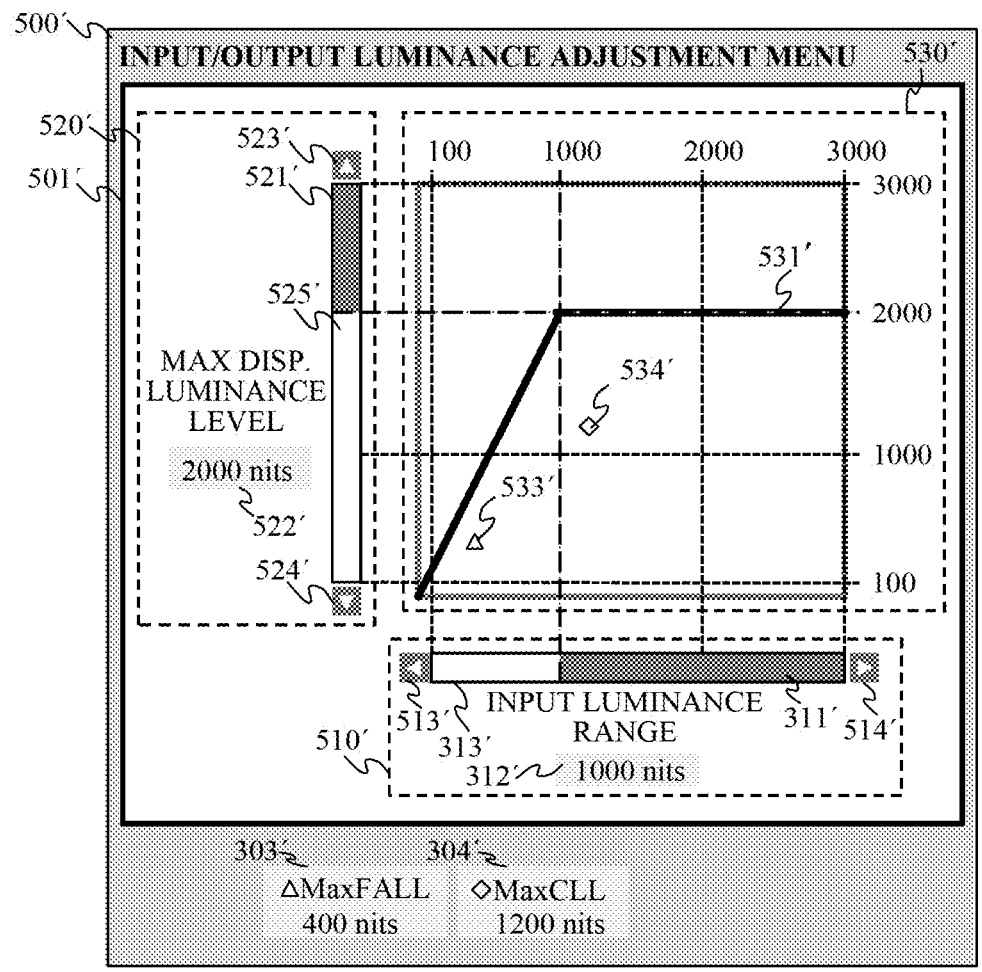
FIG. 10 is a diagram illustrating an example of an input/output luminance adjustment menu according to a fourth embodiment of the present invention.

FIG. 10 illustrates an input/output luminance adjustment menu screen generated by the input/output luminance adjustment menu unit 9' of an image display apparatus which is a fourth embodiment according to the present invention. A configuration of the image display apparatus other than an input/output luminance adjustment menu screen is the same as those in the third embodiment, and a description for the common components is omitted. In order to further improve an operability (convenience) for the user, this embodiment displays the input/output luminance adjustment menu screen as a two-dimensional menu screen indicating an input luminance range in a horizontal direction and a maximum display luminance level in a vertical direction. Further, a graph is displayed of indicating a relation between an input luminance and a display luminance (output luminance).

An input/output luminance adjustment menu screen 500' illustrated in FIG. 10 includes a two-dimensional menu 501', the MaxFALL legend 303' and the MaxCLL legend 304'. Display elements other than the two-dimensional menu 501' are the same as those in the third embodiment, and a description thereof is omitted.

The two-dimensional menu 501' includes an input luminance range column 510' that displays the input luminance range in the horizontal direction, a maximum display luminance level column 520' that displays the maximum display luminance level in the vertical direction, and an input/output luminance graph 530'.

The input luminance range column 510' includes the input luminance range indicator 311', the input luminance range adjustment value 312', an increase icon 514' and a decrease icon 513'. The input luminance range indicator 311' and the input luminance range adjustment value 312' are the same as those described with reference to FIG. 7 in the third embodiment. The increase icon 514' displays that the input luminance range (white part) 313' of the input luminance range indicator 311' can be increased by operating a right button of the operation unit 10'. The decrease icon 513' displays that the input luminance range 313' can be operated in a decreasing direction by operating a left button of the operation unit 10'.

The maximum display luminance level column 520' includes a maximum display luminance level indicator 521', a maximum display luminance level adjustment value 522', an increase icon 523' and a decrease icon 524'. The maximum display luminance level indicator 521' displays a current value 525', a lower limit value and an upper limit value of the maximum display luminance value acquired from the display luminance acquirer 8'. The lower limit value and the upper limit value of the maximum display luminance value may not be necessarily a settable lower limit value and a settable upper limit value of the image display apparatus, and may be arbitrarily set by the user. The maximum display luminance level adjustment value 522' numerically displays a current value of the maximum display luminance value in conjunction with the maximum display luminance level indicator 521'.

The increase icon 523' displays that the maximum display luminance value, that is, the illumination luminance level controlled by the display luminance controller 7' can be increased by operating the up button of the operation unit 10'. The decrease icon 524' displays that the maximum display luminance value (illumination luminance level) can be decreased by operating the down button of the operation unit 10'.

In order to improve user's operational feeling, the number of operations of the up/down buttons of the operation unit 10' and the increase/decrease of the input luminance range 313' may be made proportional. An increase/decrease amount of the illumination luminance level may be properly controlled for the display luminance controller 7' by preparing a lookup table or a mathematical expression indicating a relation between the set value of the illumination luminance level for the display luminance controller 7' and the current value of the maximum display luminance value acquired from the display luminance acquirer 8'. Such a proportional relation may not be always necessary unless the operational feeling is impaired.

The input/output luminance graph 530' includes a graph line 531' indicating a relation between the input/output luminance, a MaxFALL value 533', and a MaxCLL value 534'. The graph line 531' displays a relation between an input luminance of an HDR image and a display luminance of the display unit 5'. This embodiment uses a gamma curve that simply clips input tone that exceeds the clipping threshold described in the third embodiment with reference to FIG. 2. Thus, a graph line 531' is an inclined straight line having an inclination of maximum display luminance level adjustment value 522'/input luminance range adjustment value 312', for the input tone (input luminance) equal to or lower than the input luminance range adjustment value 312'. The graph line 531' is a horizontal straight line indicating the maximum display luminance level adjustment value 522' for the input luminance exceeding the input luminance range adjustment value 312'. When the input tone is compressed without performing the simple clipping like the gamma curve illustrated in FIG. 2, a graph line according to the compression is displayed.

When the input luminance range adjustment value 312' is increased by operating the right button of the operation unit 10', a start position of the horizontal straight line of the graph line 531' shifts to the right and the inclination of the inclined straight line decreases. When the input luminance range adjustment value 312' is decreased by operating the left button of the operation unit 10', the start position of the horizontal straight line of the graph line 531' shifts to the left and the inclination of the inclined straight line increases.

When the maximum display luminance level adjustment value 522' is increased by operating the up button of the operation unit 10', the horizontal straight line of the graph line 531' shifts upwards and the inclination of the inclined straight line increases. When the maximum display luminance level adjustment value 522' is decreased by operating the down button of the operation unit 10', the horizontal straight line of the graph line 531' shifts downwards and the inclination of the inclined straight line decreases.

The MaxFALL value 533' and the MaxCLL value 534' displays the MaxFALL value and the MaxCLL value acquired from the metadata acquirer 3' with indexes Δ and ◊, respectively. In FIG. 10, each of the MaxFALL value 533' and the MaxCLL value 534' are displayed at positions where the relation between the input luminance and the output luminance is 1:1. This allows the user to visually recognize a degree of gain for the input luminance from the positional relation with the graph line 531'. From this state, the user performs the increase/decrease adjustment on (adjusts) the input luminance range adjustment value 312' and the maximum display luminance level adjustment value 522' according to the viewing environment and the preference. An example of an adjustment thereof will be described of when a faithful luminance expression is performed for an input HDR image with reference to FIG. 11.

Figure 11:
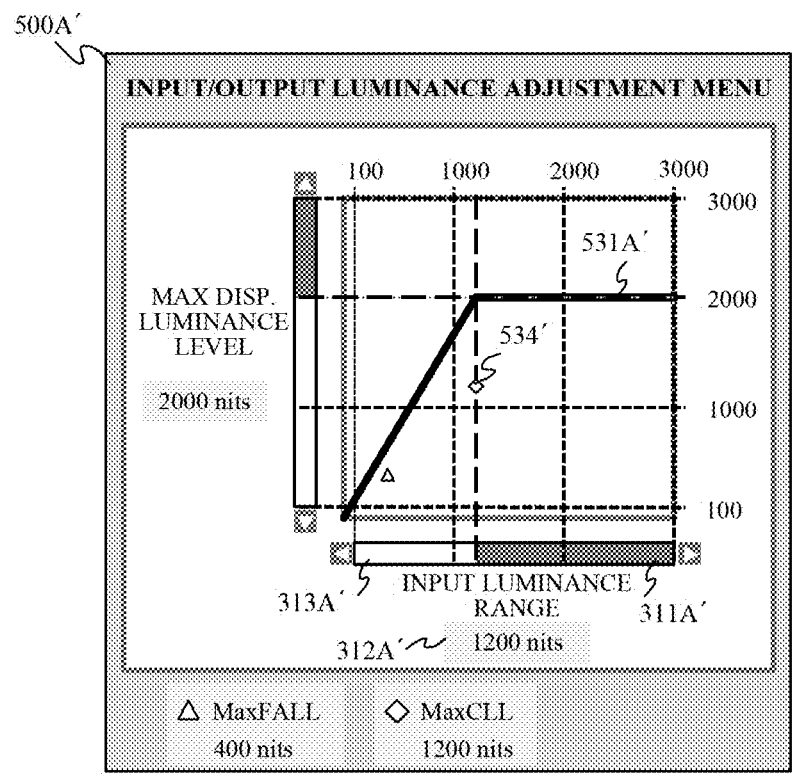
FIG. 11 is a diagram illustrating an example of an input/output luminance adjustment according to the fourth embodiment.
Figure 11:
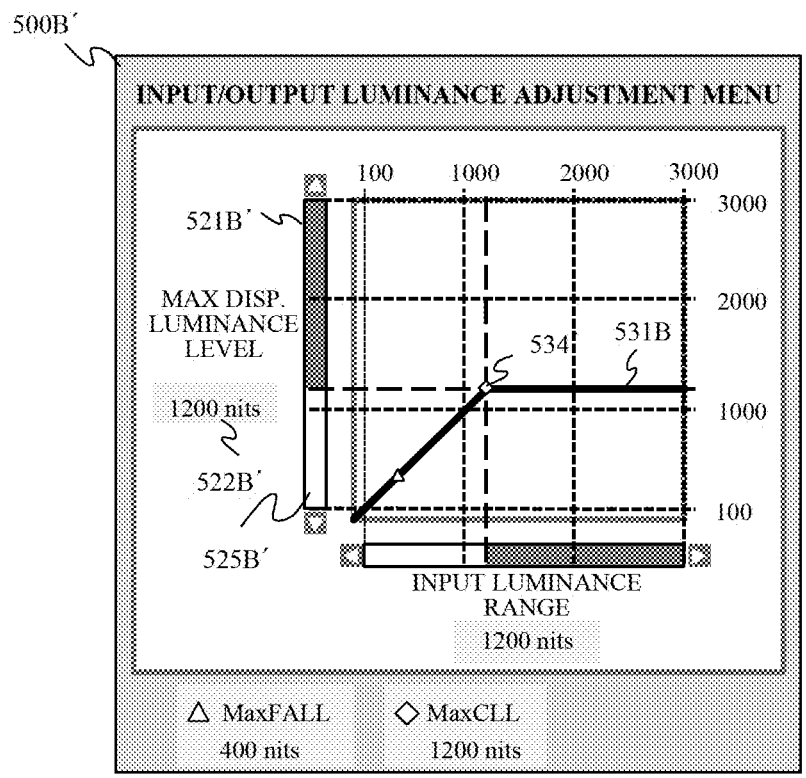

FIG. 11 illustrates a first adjustment, that is an input luminance range adjustment on the input luminance range indicator 311', and a next adjustment, that is a maximum display luminance adjustment on the illumination luminance level indicator 321. The upper side of FIG. 11 is an input/output luminance adjustment menu screen 500A' that indicates the first input luminance range adjustment. The user operates the right button of the operation unit 10' to increase the input luminance range 313A' to match the MaxCLL value 534' as indicated by the input luminance range indicator 311A'. Thereby, the input luminance range adjustment value 312A' becomes equal to the MaxCLL value of 1200 nits indicated in the MaxCLL legend 304'. By this adjustment, the maximum display luminance for the maximum input luminance of 1200 nits is 2000 nits, that is, about 1.67 times.

A lower side of FIG. 11 is an input/output luminance adjustment menu screen 500B' that indicates the next maximum display luminance adjustment. The user operates the down button of the operation unit 10' to decrease a maximum display luminance value 522B' until the maximum display luminance level 525B' moves to the same position as that of the MaxCLL value 534' as indicated in a maximum display luminance level indicator 521B'.

By performing the above adjustment, it is possible to set the maximum display luminance to 1200 nits that matches the maximum input luminance of 1200 nits. As a result, since the input luminance and the display luminance are equal to each other, it is possible to reproduce the display image with the luminance expression faithful to the input HDR image.

This embodiment has described the adjustment method for performing a luminance expression faithful to the input luminance. However, adjustments for other luminance expressions are also possible. For example, some users may prefer a gained expression over a faithful luminance expression when the viewing environment is bright. Such users do not simply adjust the set value to match the target value, but perform the adjustment so as to give feedback while checking what kind of the display image is displayed for the input HDR image with their own eyes. Also in this case, according to this embodiment in which the input luminance range and the maximum display luminance level can be adjusted by the operations with only four buttons, the user can easily perform the adjustment.

This embodiment displays both the MaxCLL value and the MaxFALL value, but these values may not be necessarily displayed. That is, even if these values are not displayed, when the input luminance range column and the maximum display luminance level column are displayed in the input/output luminance adjustment menu screen on the same screen, it is possible to improve the convenience of the user's input/output luminance adjustment.

Differently from this embodiment, the maximum display luminance level may be displayed in the horizontal direction and the input luminance range may be displayed in the vertical direction. That is, the maximum display luminance level may be displayed in one of the horizontal and vertical directions, and the input luminance range may be displayed in the other.

Fifth Embodiment

Figure 12:
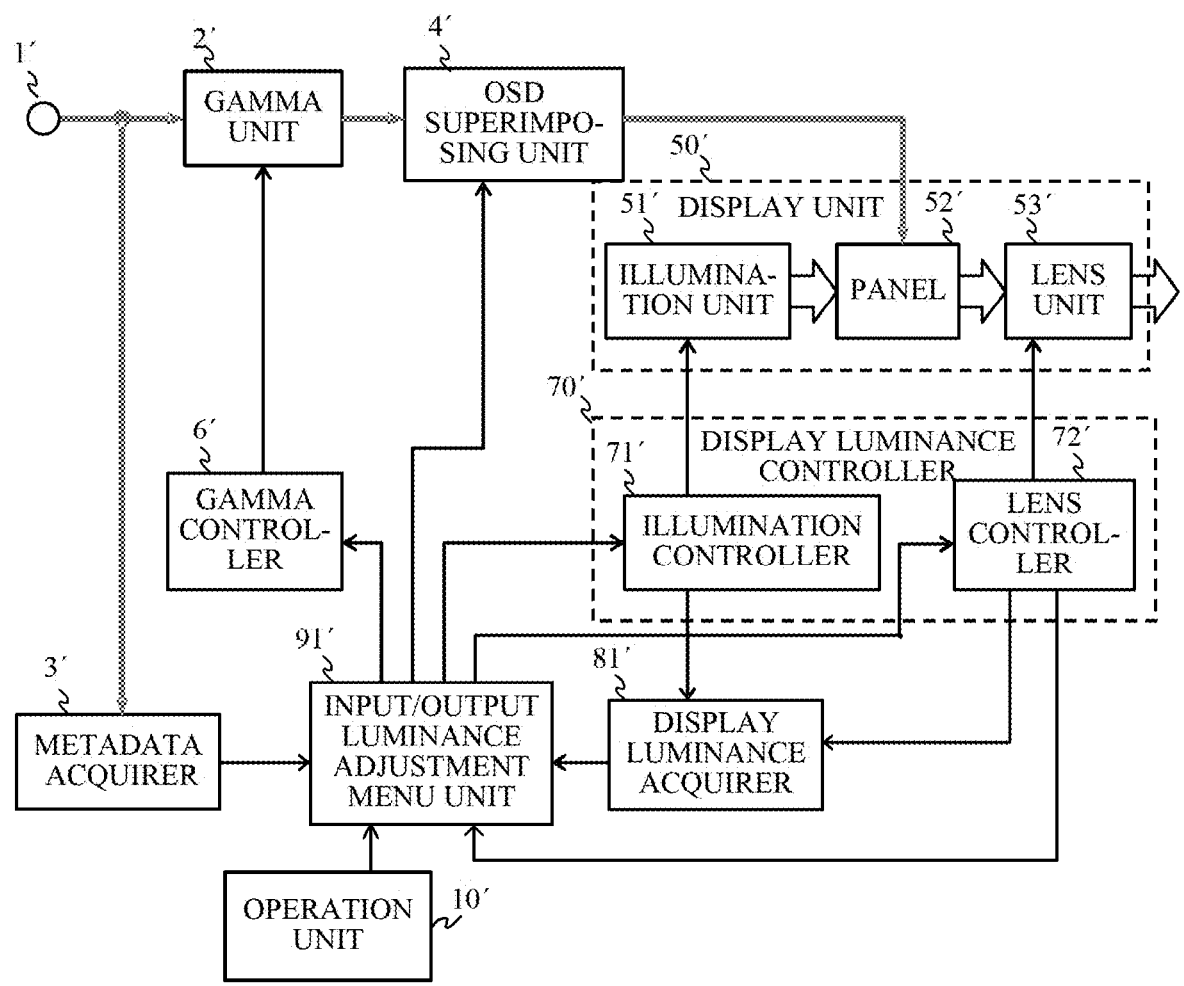
FIG. 12 is a block diagram illustrating a configuration of an image display apparatus according to a fifth embodiment of the present invention.

FIG. 12 illustrates a configuration of an image display apparatus which is a fifth embodiment according to the present invention. The image display apparatus of this embodiment is a projector, and includes image the input unit 1', the gamma unit 2', the metadata acquirer 3', the OSD superimposing unit 4', a display unit 50', the gamma controller 6', a display luminance controller 70', a display luminance acquirer 81', an input/output luminance adjustment menu unit 91' and the operation unit 10'. The image input unit 1', the gamma unit 2', the metadata acquirer 3', the OSD superimposing unit 4' and the gamma controller 6' are the same as those described in the third embodiment (FIG. 7), and thus a description thereof is omitted.

The display unit 50' includes an illumination unit 51', a light modulation panel 52' and a projection lens unit 53'. The illumination unit 51' includes an illumination light source and its driving circuit, and is changeable of an intensity of an illumination light emitted from an illumination light source. An LED, a laser diode (LD), an ultra-high-pressure mercury lamp, or the like can be used as the illumination light source. The light modulation panel 52' is a liquid crystal panel, a digital micromirror device, or the like, and is configured to modulate the illumination light for each pixel according to a tone of an input image. The projection lens unit 53' has functions of a magnification variation (zoom) and focusing, and a lens shift function in horizontal/vertical directions that are directions orthogonal to an optical axis of the projection lens unit 53', and is configured to enlarge and project the image light modulated by the light modulation panel 52' onto a projection surface such as a screen.

The display luminance controller 70' includes an illumination controller 71' and a lens controller 72', and is configured to adjust a luminance of the projection image displayed on the projection surface by the display unit 50'. The illumination controller 71' is configured to control an illumination luminance level of the illumination unit 51' in response to an illumination luminance level adjustment request from the input/output luminance adjustment menu unit 91' described later. Similarly to the third embodiment, this embodiment also controls the illumination luminance level in 1% units in a range of 10% to 100%. The range and the unit of the illumination luminance level are merely examples, and other ranges and units may be used. A relation between the display luminance of the projection image displayed by the display unit 50' and the illumination luminance level may be linear or non-linear.

The lens controller 72' is configured to control zoom, focus, a horizontal shift and a vertical shift of the projection lens unit 53' in response to a zoom adjustment request, a focus adjustment request, a horizontal shift adjustment request, and a vertical shift adjustment request from the input/output luminance adjustment menu unit 91'.

The display luminance on the projection surface is correlated with a size (area) of the projection image on the projection surface (hereinafter also referred to as a projection area or a projection size). The projection size is correlated with a distance between the projector and the projection surface (hereinafter referred to as a projection distance) and with a zoom magnification (zoom position) of the projection lens unit 53'. The projection distance is correlated with a position of a focus lens (focus position) when the projection image is in focus. The display luminance on the projection surface varies according to horizontal and vertical shift positions (shift state) of the projection lens unit 53'.

Thus, it is possible to make the maximum display luminance on the projection surface relate to four lens parameters indicating the state of the projection lens unit 53', that is, the zoom position, focus position, horizontal and vertical shift position.

The display luminance on the projection surface is also correlated with the illumination luminance level of the illumination unit 51', but it is possible to separately consider the relation between the adjustment of the illumination luminance level and the display luminance and the relation between the state of the projection lens unit 53' and the display luminance. This embodiment assumes that the projection lens unit 53' has a transmittance that depends on the above four lens parameters. When a combination of four lens parameters that maximizes the display luminance is assumed to be 100% transmittance, the transmittance is decreased by changing any of the lens parameters. The relation between the four lens parameters and the transmittance is determined by a design of the projection lens unit 53', and thus can be calculated by the lens controller 72 (a description is omitted of the calculation method).

In the following description, the illumination luminance level and the above described four lens parameters, each of which is correlated with (that is, affects) the display luminance, are collectively referred to as a display condition.

The display luminance acquirer 81' is configured to calculate a current maximum display luminance in the display unit 50' by using a current illumination luminance level acquired from the illumination controller 71' and a current transmittance of the projection lens unit 53' acquired from the lens controller 72', and to output it to the input/output luminance adjustment menu unit 91'. The display luminance acquirer 81' is, for example, configured to store maximum display luminance corresponding to various illumination luminance levels at the 100% transmittance on a memory such as a non-volatile memory (not illustrated) in advance, and thereafter to acquire the maximum display luminance corresponding to an actual illumination luminance level by reading it from the memory. By multiplying the read maximum display luminance by the transmittance, the maximum display luminance corresponding to the transmittance can be acquired.

In this case, the maximum display luminance for various illumination luminance levels may be measured by using a luminance sensor during a manufacturing process of the projector, and the measurement result may be stored on memory. The display luminance acquirer 81' may calculate and acquire the maximum display luminance corresponding to the actual illumination luminance level by using, for example, an arithmetic expression that can calculate the maximum display luminance corresponding to the various illumination luminance levels. Alternatively, the projector may be provided with a luminance sensor, the display unit 50' may display an all-white image, and the luminance sensor may measure the maximum display luminance.

The input/output luminance adjustment menu unit 91' is configured to generate an input/output luminance adjustment menu screen which the user views at the time of adjusting (setting), via the operation unit 10', an input luminance range of the HDR image, the illumination luminance level and the lens parameters. The input/output luminance adjustment menu screen is output to the OSD superimposing unit 4', and the input/output luminance adjustment menu screen is superimposed on an image signal and is output to the display unit 50'. The input/output luminance adjustment menu unit 91' of this embodiment is different from the input/output luminance adjustment menu unit 9' of the third embodiment only in that the input/output luminance adjustment menu unit 91' includes a menu for adjusting the state of the projection lens unit 53'.

Figure 13:
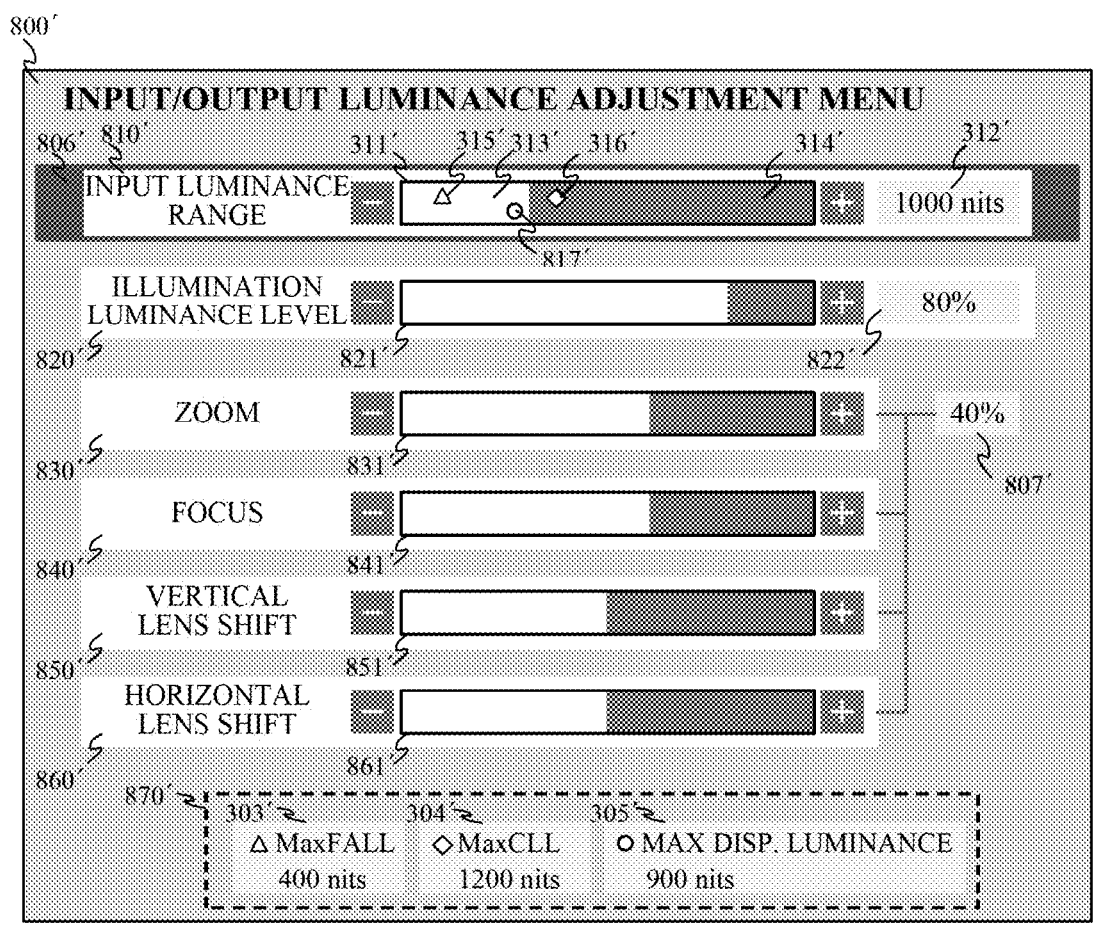
FIG. 13 is a diagram illustrating an example of an input/output luminance adjustment menu according to the fifth embodiment.

FIG. 13 illustrates an input/output luminance adjustment menu screen 800' in this embodiment. The input/output luminance adjustment menu screen 800' includes an input luminance range column 810', an illumination luminance level column 820', a zoom column 830', a focus column 840', a vertical lens shift column 850', a horizontal lens shift column 860', a lens transmittance 807', a column selecting frame 806' and a legend 870'.

The column selecting frame 806' is displayed to surround a column including an item in an operation waiting state among the input luminance range column 810', the illumination luminance level column 820', the zoom column 830', the focus column 840', the vertical lens shift column 850', the horizontal lens shift column 860' and the lens transmittance 807'. FIG. 13 illustrates the operation waiting state of increasing/decreasing the item (input luminance range 313') in the input luminance range column 810'. When the user operates the up/down buttons of the operation unit 10', the column selecting frame 806' changes to a state of surrounding any of the above six columns 810', 820', 830', 840', 850' and 860' and the lens transmittance 807'.

The input luminance range column 810' includes the input luminance range indicator 311' and the input luminance range adjustment value 312'. The input luminance range indicator 311' includes the input luminance range 313', the clipping range 314', the MaxFALL value 315', the MaxCLL value 316', and a maximum display luminance value 817', each of which is displayed an index. The input luminance range 313', the clipping range 314', the MaxFALL value 315', and the MaxCLL value 316' are the same as those in the third embodiment, and thus a description thereof is omitted. The maximum display luminance value 817' displays a value of a maximum display luminance value acquired from the display luminance acquirer 81' with an index ○. When any of the illumination luminance level, the zoom position, the focus position, the vertical shift position and the horizontal shift position is changed, the maximum display luminance value 817' varies and thus the display position moves to the left and right accordingly.

The illumination luminance level column 820' includes an illumination luminance level indicator 821' and an illumination luminance level value 822'. The illumination luminance level indicator 821' and the illumination luminance level value 822' are respectively different from the illumination luminance level indicator 321' and the illumination luminance level value 322' described in the third embodiment only in adjusting the illumination luminance level by the display luminance controller 71' instead of by the display luminance controller 7'.

The zoom column 830' includes a zoom lens adjustment indicator 831'. When the user operates the operation unit 10' in an increasing (+) direction with the zoom column 830' surrounded by the column selecting frame 806', a white part of the indicator 831' becomes wider and the lens controller 72' changes the zoom position of the projection lens unit 53' so as to enlarge the projection size. When the user operates the operation unit 10' in a decreasing (−) direction, the white part of the indicator 831' becomes narrower and the lens controller 72' changes the zoom position of the projection lens unit 53' so as to decrease the projection size. Each of these cases changes the maximum display luminance value 817' and a value of the lens transmittance 807'.

The focus column 840' includes a focus lens adjustment indicator 841'. When the user operates the operation unit 10' in the increasing direction with the focus column 840' surrounded by the column selecting frame 806', a white part of the indicator 841' becomes wider and the lens controller 72' changes the focus position so that the focus position moves away. When the user operates the operation unit 10' in the decreasing direction, the white part of the indicator 841' becomes narrower and the lens controller 72' changes the focus position so that the focus position approaches. Each of these cases changes the maximum display luminance value 817' and the value of the lens transmittance 807'.

The vertical lens shift column 850' includes a vertical lens shift adjustment indicator 851'. When the user operates the operation unit 10' in an increasing direction with the vertical lens shift column 850' surrounded by the column selecting frame 806', a white part of the indicator 851' becomes wider and the lens controller 72' moves the vertical shift position of the projection lens unit 53' upwards. When the user operates the operation unit 10' in the decreasing direction, the white part of the indicator 851' becomes narrower and the lens controller 72' moves the vertical shift position of the projection lens unit 53' downwards. Each of these cases changes the maximum display luminance value 817' and the value of the lens transmittance 807'.

The horizontal lens shift column 860' includes a horizontal lens shift adjustment indicator 861'. When the user operates the operation unit 10' in the increasing direction with the horizontal lens shift column 860' surrounded by the column selecting frame 806', a white part of the indicator 861' becomes wider and the lens controller 72' moves the horizontal shift position of the projection lens unit 53' to the right. When the user operates the operation unit 10' in the decreasing direction, the white part of the indicator 861' becomes narrower, and the lens controller 72' moves the horizontal shift position of the projection lens unit 53' to the left. Each of these cases changes the maximum display luminance value 817' and the value of the lens transmittance 807'.

The lens transmittance 807' displays the transmittance of the projection lens unit 53' required by the lens controller 72'. The legend 870' includes the MaxFALL legend 303', the MaxCLL legend 304', and the maximum display luminance legend 305'. Since these legends 303' to 305' are the same as those in the third embodiment, a description thereof is omitted.

FIG. 13 illustrates that an input/output luminance ratio is not 1:1 from a positional relation between the input luminance range 313', the MaxCLL value 316', and the maximum display luminance value 817', and that the tone in a bright part of the content of the input HDR image is saturated. By viewing this, the user adjusts the input luminance range and the illumination luminance level and/or the lens parameter as the display condition that affects the maximum display luminance value according to the viewing environment and his/her preference. Specifically, the adjustment is basically as that described in the third embodiment.

This embodiment can improve convenience for the user to adjust the input luminance range and the display condition by displaying the input luminance range column 810' and the columns for displaying the display conditions (820', 830', 840', 850', 860', 807') on the same input/output luminance adjustment menu screen 800'.

This embodiment describes the case where the projection size is calculated from the zoom position and the focus position. However, the user may input the projection size via the operation unit 10'. As described in the fourth embodiment, the input luminance range indicator 311 and the illumination luminance level indicator 821' may be displayed on a two-dimensional menu screen.

Sixth Embodiment

Figure 14:
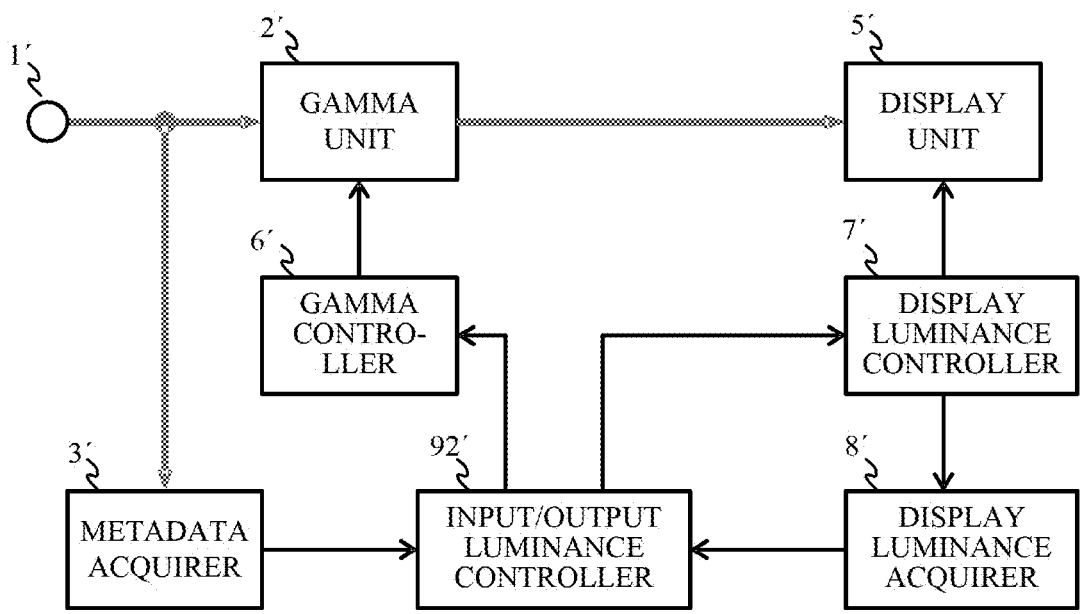
FIG. 14 is a block diagram illustrating a configuration of an image display apparatus according to a sixth embodiment of the present invention.

FIG. 14 illustrates the configuration of an image display apparatus which is a sixth embodiment according to the present invention. The image display apparatus includes the image input unit 1', the gamma unit 2', the metadata acquirer 3', the display unit 5', the gamma controller 6', the display luminance controller 7', the display luminance acquirer 8', and an input/output luminance controller 92'. The components other than the input/output luminance controller 92' are the same as those in the third embodiment, and thus description thereof is omitted.

The input/output luminance controller (controlling unit) 92' is configured to automatically adjust (control) the input luminance range and the illumination luminance level of an HDR image according to the MaxCLL value acquired by the metadata acquirer 3'.

Figure 15:
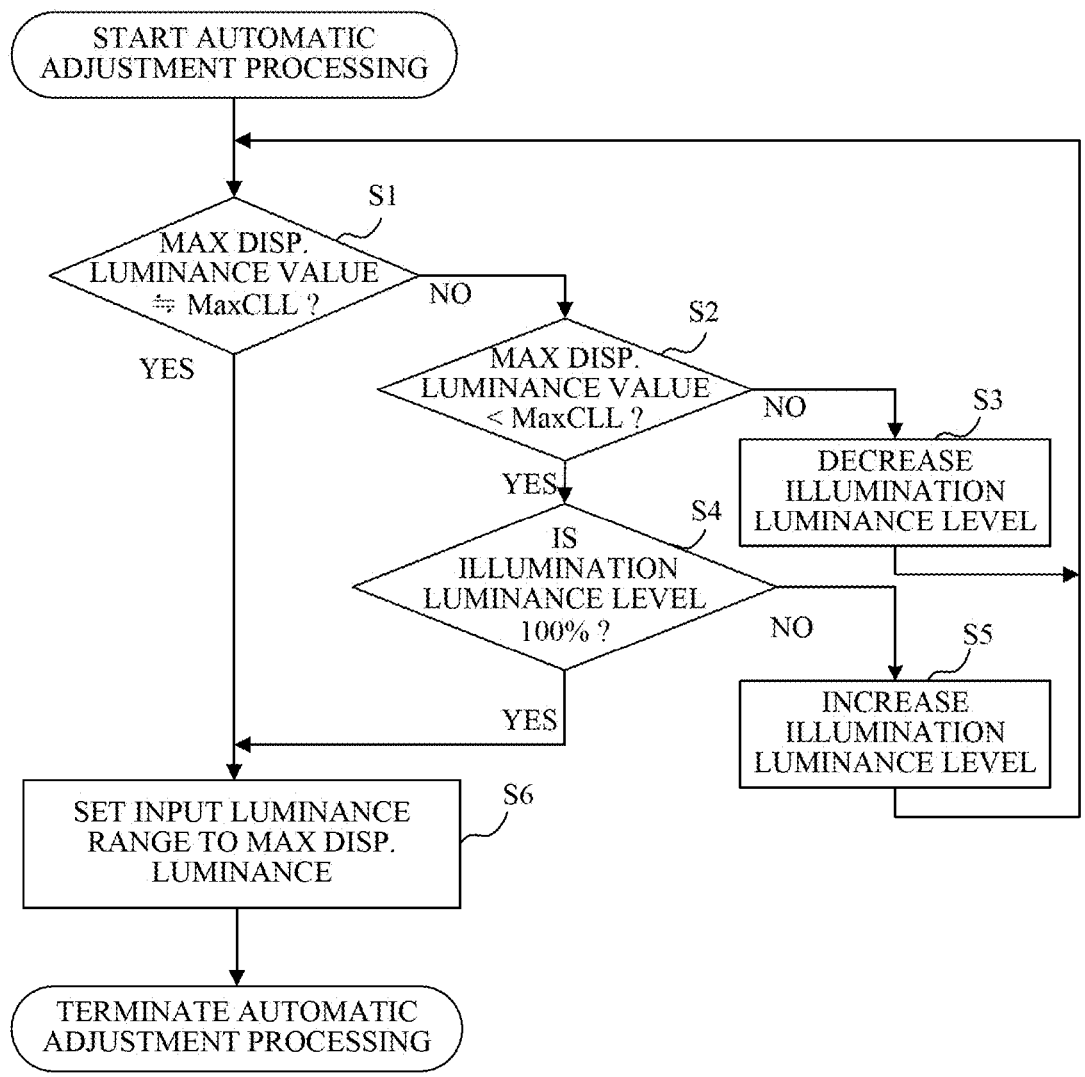
FIG. 15 is a flowchart illustrating processing performed by an input/output luminance controller according to the sixth embodiment.

A description will be given of automatic adjustment processing of an input luminance range and an illumination luminance level performed by the input/output luminance controller 92' with reference to a flowchart of FIG. 15. The input/output luminance controller 92' as a computer is configured to execute this processing according to a computer program.

In the step S1, the input/output luminance controller 92' compares the maximum display luminance value acquired from the display luminance acquirer 8' with the MaxCLL value acquired from the metadata acquirer 3'. When these values are almost equal (a difference is equal to or less than a small predetermined value), the process proceeds to the step S6, otherwise proceeds to the step S2.

In the step S2, the input/output luminance controller 92' compares the maximum display luminance value with the MaxCLL value. The input/output luminance controller 92' proceeds to the step 3 when the maximum display luminance value is larger than the MaxCLL value with a difference exceeding the predetermined value, and proceeds to the step S4 when the MaxCLL value is larger than the maximum display luminance with a difference exceeding the predetermined value.

In the step S3, the input/output luminance controller 92' requests the display luminance controller 7' to decrease the illumination luminance level, and returns to the step S1. A decrease amount of the illumination luminance level at this time may be a same amount regardless of the difference between the MaxCLL and the maximum display luminance value, or may be different according to the difference.

In the step S4, the input/output luminance controller 92' confirms whether the illumination luminance level controlled by the display luminance controller 7' reaches 100%. The input/output luminance controller 92' proceeds to the step S6 when the illumination luminance level reaches 100%, otherwise proceeds to the step S5.

In the step S5, the input/output luminance controller 92' requests the display luminance controller 7' to increase the illumination brightness level, and the process returns to the step S1. An increase amount of the illumination luminance level at this time may be a same amount regardless of the difference between the MaxCLL and the maximum display luminance value, or may be different according to the difference.

In the step S6, the input/output luminance controller 92' outputs a request to the gamma controller 6' so that the input luminance range is closest to the maximum display luminance value, in other words, so that the clipping threshold is adjusted to the maximum display luminance value. Thereafter, this processing terminates.

By performing the automatic adjustment processing of the input luminance range and the illumination luminance level as described in this embodiment, the maximum display luminance value can be adjusted to be almost equal to or closest to the MaxCLL while the input/output luminance ratio is kept at 1:1.

This embodiment may be implemented in combination with any of the third to sixth embodiments. Thereby, it is possible to omit part of the operations performed by the user in the third to sixth embodiments, and to further improve convenience for the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can improve convenience for a user to adjust a dynamic range and a display luminance when displaying an image such as an HDR image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image display apparatus comprising:
   a display unit including an illumination unit configured to emit an illumination light and change an intensity of the illumination light, and a light modulation element configured to modulate the illumination light, the display unit being configured to display an image by projecting a light modulated using the light modulation element onto a projection surface;
   an input unit configured to receive input data including an input image in which a first dynamic range is defined and including information relating to luminance of the input image, and
   at least one processor or circuit configured to execute a plurality of tasks including:
   a converting task configured to convert the first dynamic range into a second dynamic range having a maximum luminance lower than that of the first dynamic range;
   a set value acquiring task configured to acquire a user set maximum luminance that is a user set value of the maximum luminance of the second dynamic range;
   a luminance acquiring task configured to acquire a maximum display luminance that is a display luminance when the display unit displays the maximum luminance of the second dynamic range under the intensity of the illumination light set for the illumination unit; and a generating task configured to generate a setting screen used for a user setting of the user set value and to make the display unit display the setting screen, wherein a) the information relating to luminance acquired from the data, b) the user set maximum luminance and c) the maximum display luminance are displayed on the setting screen in a comparable way.

2. The image display apparatus according to claim 1,
wherein a first EOTF is defined for the first dynamic range of the input image, and
wherein the converting task converts the first EOTF into a second EOTF defined for the second dynamic range.

3. The image display apparatus according to claim 2,
wherein the first EOTF is SMPTE ST2084.

4. The image display apparatus according to claim 1,
wherein the luminance acquiring task acquires the maximum display luminance by using a sensor configured to measure a luminance of an image displayed by the display unit or of an image display surface of the display unit.

5. The image display apparatus according to claim 1,
wherein the display unit includes a luminance adjusting unit configured to adjust a display luminance by changing the intensity of the illumination light or a light reduction amount of the illumination light, and
wherein the luminance acquiring task acquires the maximum display luminance by using the light emission intensity or the light reduction amount each of which is adjusted by the luminance adjusting unit.

6. The image display apparatus according to claim 1,
wherein the at least one processor or circuit configured to execute a task of:
a setting condition acquiring task configured to acquire a user set display condition that is a user set value of the intensity of the illumination light set for the illumination unit,
wherein the luminance acquiring task acquires the maximum display luminance that is a display luminance when the display unit displays the user set maximum luminance under the user set display condition, and
wherein the setting screen includes, on a same screen, a first set area used for a user setting of the user set maximum luminance and a second set area used for a user setting of the user set display condition.

7. The image display apparatus according to claim 6,
wherein the setting screen displays information indicating a relative relation between the information relating to luminance and at least one of the user set maximum luminance and the user set display condition.

8. The image display apparatus according to claim 6,
wherein the setting screen displays information indicating a relative relation between the maximum display luminance and at least one of the user set maximum luminance and the user set display condition.

9. The image display apparatus according to claim 6,
wherein the setting screen two-dimensionally displays the first set area and the second set area such that the first set area is displayed in one of a horizontal direction and a vertical direction of the setting screen and the second set area is displayed in the other of the horizontal and vertical directions,
wherein the setting screen further displays a graph indicating a relation between a luminance of the input image and the display luminance.

10. The image display apparatus according to claim 1,
wherein the display unit includes a projection optical system configured to project an image light onto a projection surface, and
wherein at least one of a zoom state and a focus state of the projection optical system is displayed on the setting screen.

11. The image display apparatus according to claim 10,
wherein the projection optical system is shiftable in a direction orthogonal to an optical axis of the projection optical system, and
wherein a shift state of the projection optical system is displayed on the setting screen.

12. The image display apparatus according to claim 10,
wherein a state correlated with at least one of an area of the projected image on the projection surface and a distance from the image display apparatus to the projection surface is displayed on the setting screen.

13. The image display apparatus according to claim 1,
wherein the at least one processor or circuit configured to execute a task of:
a controlling task configured to control at least one of the intensity of the illumination light and the maximum luminance of the second dynamic range by using the maximum display luminance and the information relating to luminance of the input image.

14. The image display apparatus according to claim 13, wherein
the controlling task changes the intensity of the illumination light when the maximum display luminance and the information relating to luminance of the input image have a difference larger than a predetermined value, and
wherein the controlling task matches the maximum luminance of the second dynamic range to the maximum display luminance when the maximum display luminance and the information relating to luminance of the input image do not have the difference larger than the predetermined value.

15. A control method of an image display apparatus including a display unit including an illumination unit configured to emit an illumination light and change an intensity of the illumination light, and a light modulation element configured to modulate the illumination light, the display unit being configured to display an image by projecting a light modulated using the light modulation element onto a projection surface, and being configured to receive input data including an input image in which a first dynamic range is defined and including information relating to luminance of the input image, the control method comprising steps of:
converting the first dynamic range into a second dynamic range having a maximum luminance lower than that of the first dynamic range;
acquiring a user set maximum luminance that is a user set value of the maximum luminance of the second dynamic range;
acquiring a maximum display luminance that is a display luminance when the display unit displays the maximum luminance of the second dynamic range under the intensity of the illumination light set for the illumination unit; and
generating a setting screen used for a user setting of the user set value and making the display unit display the setting screen, wherein a) the information relating to luminance acquired from the data, b) the user set maximum luminance and c) the maximum display luminance are displayed on the setting screen in a comparable way.

16. A non-transitory computer-readable storage medium storing a computer program that causes a computer of an image display apparatus to execute a controlling method, wherein the image display apparatus includes a display unit including an illumination unit configured to emit an illumination light and change an intensity of the illumination light, and a light modulation element configured to modulate the illumination light, the display unit being configured to display an image by projecting a light modulated using the light modulation element onto a projection surface, and being configured to receive input data including an input image in which a first dynamic range is defined and including information relating to luminance of the input image, and wherein the control method includes steps of:
converting the first dynamic range into a second dynamic range having a maximum luminance lower than that of the first dynamic range;
acquiring a user set maximum luminance that is a user set value of the maximum luminance of the second dynamic range;
acquiring a maximum display luminance that is a display luminance when the display unit displays the maximum luminance of the second dynamic range under the intensity of the illumination light set for the illumination unit; and
generating a setting screen used for a user setting of the user set value and making the display unit display the setting screen, wherein a) the information relating to luminance acquired from the data, b) the user set maximum luminance and c) the maximum display luminance are displayed on the setting screen in a comparable way.

* * * * *